US009710732B2

(12) United States Patent
Kanda et al.

(10) Patent No.: US 9,710,732 B2
(45) Date of Patent: Jul. 18, 2017

(54) PRINTER FOR PERFORMING PRINTING BASED ON COMBINED OBJECT DATA INCLUDING TWO OR MORE OBJECT DATA

(71) Applicant: Brother Kogyo Kabushiki Kaisha, Nagoya-shi, Aichi-ken (JP)

(72) Inventors: Mitsuhiro Kanda, Nagoya (JP); Satoru Moriyama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/657,832

(22) Filed: Mar. 13, 2015

(65) Prior Publication Data

US 2015/0347877 A1 Dec. 3, 2015

(30) Foreign Application Priority Data

May 30, 2014 (JP) ................................ 2014-113166

(51) Int. Cl.
*G06F 15/00* (2006.01)
*G06K 15/02* (2006.01)
*G06K 15/00* (2006.01)

(52) U.S. Cl.
CPC ......... *G06K 15/024* (2013.01); *G06K 15/005* (2013.01); *G06K 15/022* (2013.01); *G06K 15/1802* (2013.01); *G06K 15/007* (2013.01); *G06K 2215/0082* (2013.01)

(58) Field of Classification Search
CPC .................................................... G06K 15/181
USPC ........................................................ 358/1.15
See application file for complete search history.

(56) References Cited

U.S. PATENT DOCUMENTS 8,464,151 B2 * 6/2013 Miyazawa ............ G06F 17/243 715/243
2008/0007756 A1 1/2008 Tanaka et al.
2008/0007781 A1 1/2008 Oike et al.
2012/0062917 A1 * 3/2012 Hirsch et al. ........ B42D 15/027 358/1.9

(Continued)

FOREIGN PATENT DOCUMENTS

JP 2006-178847 A 7/2006
JP 2006-268388 A 10/2006
JP 2008-015846 A 1/2008

(Continued)

*Primary Examiner* — Mark Milia
(74) *Attorney, Agent, or Firm* — Banner & Witcoff, Ltd.

(57) ABSTRACT

A communication portion receives object data corresponding to an object. A processor receives a record including single object data and object names from an external device. The processor first stores the record and object names and first selects the object name having a predetermined configuration. The processor second selects, as at least two selected object data, at least two of the single object data, from the plurality of single object data included in the record, based on the configuration of the object name selected by the first selecting. The processor generates the combined object data that includes the at least two selected object data selected by the second selecting, as at least two setting object data. The processor second stores the generated combined object data. The processor prints a print image on the print medium, using the printing mechanism, based on the combined object data.

12 Claims, 26 Drawing Sheets

RAM 52
ROM 53
HDD 54
COMM 55
INPUT 56
DSPL 57
51 CPU
1
47
4
46
5
41
3
46 INPUT
47 DSPL
48 THRM HEAD
49 ROLLER
CPU
RAM 42
43 FLASH ROM
EEPROM 44
COMM 45

(56) References Cited

U.S. PATENT DOCUMENTS

| | | | | |
|---|---|---|---|---|
| 2012/0262735 | A1* | 10/2012 | Meyerhofer | G06Q 20/342 358/1.6 |
| 2014/0139867 | A1 | 5/2014 | Moriyama et al. | |

FOREIGN PATENT DOCUMENTS

| | | | |
|---|---|---|---|
| JP | 2008-015853 | A | 1/2008 |
| JP | 2010-129075 | A | 6/2010 |
| JP | 2014-100893 | A | 6/2014 |

* cited by examiner

PRINTER FOR PERFORMING PRINTING BASED ON COMBINED OBJECT DATA INCLUDING TWO OR MORE OBJECT DATA

CROSS-REFERENCE TO RELATED APPLICATION

This application claims priority to Japanese Patent Application No. 2014-113166 filed on May 30, 2014, the disclosure of which is herein incorporated by reference in its entirety.

BACKGROUND

The present disclosure relates to a printer.

A printer is known that is capable of generating a label by performing printing on a tape. In this type of printer, a function is known that prints on the tape based on a plurality of items respectively included in a plurality of records of a database imported from an external device. The items are hereinafter referred to as object data, and a print target image (a character string, etc.) that is to be printed on the tape based on the object data is referred to as an object. Examples of categories of the object data include "Product code," "Product name," "Price" and "Barcode" etc. In known technology, technology is disclosed that determines whether printing by the printer is possible based on a CSV file having the extension "csv" and transmits a CSV file to a printer when printing is possible. The printer that has received the CSV file transmitted using this technology prints the object on the tape based on a plurality of object data respectively included in a plurality of records of the CSV file.

SUMMARY

In the printer, a demand occurs in which it is desired to generate new object data (hereinafter referred to as combined object data) in which two or more of the received plurality of object data are combined. For example, there is a case in which it is desired to combine the respective object data of the categories "Product code" and "Price" and generate the combined object data by which the "Barcode" can be printed using the printer. As an example of this type of case, a case can be given in which at least one of the plurality of object data included in the combined object data is edited by the printer. In this case, it is necessary for the combined object data that includes the edited object data to be similarly edited, and it is preferable for the combined object data to be generated in the printer.

However, in the above-described case, based on the CSV file, it is not possible to identify how two or more of the object data are selected from the plurality of object data of the received CSV file and how the combined object data is thereby generated. Therefore, in order to generate the combined object data in the printer, it is necessary for a user to set, on the printer, the two or more object data to be included in the combined object data. In this case, time and effort are required for the user to perform the operation, and it is not possible for the printer to easily perform printing based on the combined object data.

Various embodiments of the general principles described herein provide a printer that is capable of easily performing printing based on combined object data that includes two or more object data.

Embodiments herein provide a printer configured to print a print image having a plurality of objects onto a print medium. The printer includes a communication portion, a storage portion, a printing mechanism and a processor. The communication portion is provided to receive a plurality of object data from an external device. Each of the plurality of object data corresponds to each of a plurality of objects. The storage portion is configured to store at least the plurality of object data. The printing mechanism is provided to form the print image on the print medium. The processor is provided to control the communication portion, the storage portion and the printing mechanism.

The processor receives at least a record and a plurality of object names from the external device. The record includes a plurality of single object data. The plurality of object names are names respectively corresponding to the plurality of single object data. The single object data is the object data other than combined object data. The combined object data is the object data in which at least two of the single object data are combined. The processor first stores, in the storage portion, the record and the plurality of object names received by the receiving. The processor first selects the object name having a predetermined configuration, from the plurality of object names stored in the storage portion. The processor second selects, as at least two selected object data, at least two of the single object data, from the plurality of single object data included in the record stored in the storage portion, based on the configuration of the object name selected by the first selecting. The processor generates the combined object data that includes the at least two selected object data selected by the second selecting, as at least two setting object data. The processor second stores, in the storage portion, the generated combined object data. The processor prints a print image on the print medium, using the printing mechanism, based on the combined object data stored in the storage portion.

BRIEF DESCRIPTION OF THE DRAWINGS

Embodiments will be described below in detail with reference to the accompanying drawings in which.

DETAILED DESCRIPTION

Figure 1:
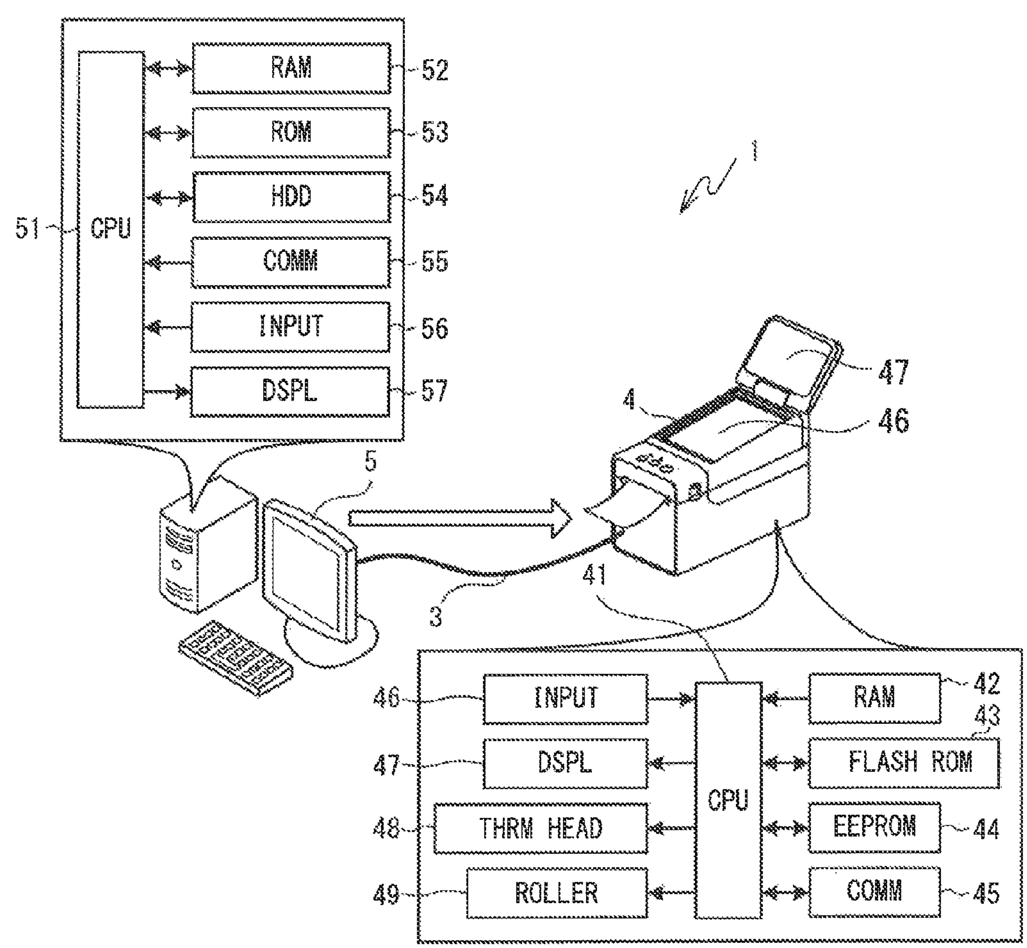
FIG. 1 is a diagram showing an overview of a printing system and an electrical configuration of a printer and a PC.

An overview of a printing system 1 will be explained with reference to FIG. 1. The printing system 1 is provided with a printer 4 and a PC 5. The printer 4 and the PC 5 are connected via a cable 3. The printer 4 and the PC 5 can communicate via the cable 3.

The printer 4 is configured such that a tape cassette (not shown in the drawings) can be mounted therein. The printer 4 is a tape printer that can perform printing (form a plurality of dots) on a tape that is fed out from the tape cassette and thus create a label. The printer 4 receives a DB file 432 (refer to FIG. 2) that is shown in a comma-separated values (CSV) format, and template data 431 (refer to FIG. 4) from the PC 5. DB is an abbreviation of database. The DB file 432 that is shown in the CSV format is hereinafter referred to as a "CSV file of the DB file 432" or simply as the "CSV file." The printer 4 performs template printing based on the received template data 431 and CSV file. The template printing will be explained in detail later. The PC 5 generates and edits the template data 431 and the DB file 432 that is the basis of the CSV file in accordance with an input operation on an input portion 56. The PC 5 can transmit the template data 431 and the CSV file to the printer 4 and cause the printer 4 to perform the template printing.

An electrical configuration of the printer 4 will be explained. The printer 4 is provided with a CPU 41, a RAM 42, a flash ROM 43, an EEPROM 44, a communication portion 45, an input portion 46, a display portion 47, a thermal head 48 and a roller 49. The CPU 41 executes control of the printer 4. The CPU 41 is electrically connected to the RAM 42, the flash ROM 43, the EEPROM 44, the communication portion 45, the input portion 46, the display portion 47, the thermal head 48 and the roller 49. Various temporary data are stored in the RAM 42. Programs used by the CPU 41 to execute control of the printer 4 are stored in the flash ROM 43. Further, the template data 431 and the CSV file received from the PC 5 are stored in the flash ROM 43. Dot pattern data for printing used to print various characters and barcodes are categorized by font and size and stored in the EEPROM 44. The communication portion 45 is a controller that is used to perform communication with the PC 5. The input portion 46 is a touch panel. The display portion 47 is an LCD. The thermal head 48 emits heat in response to a signal from the CPU 41 and performs printing on a tape. The roller 49 is a tape feed roller that feeds the tape.

An electrical configuration of the PC 5 will be explained. The PC 5 is provided with a CPU 51, a RAM 52, a ROM 53, an HDD 54, a communication portion 55, the input portion 56 and a display portion 57. The CPU 51 executes control of the PC 5. The CPU 51 is electrically connected to the RAM 52, the ROM 53, the HDD 54, the communication portion 55, the input portion 56 and the display portion 57. Various temporary data are stored in the RAM 52. A BIOS and the like are stored in the ROM 53. Programs used by the CPU 51 to execute control of the PC 5, and an OS are stored in the HDD 54. Further, the template data 431 and the DB file 432 are stored in the HDD 54. The communication portion 55 is a controller to perform communication with the printer 4. The input portion 56 is a keyboard and a mouse. The display portion 57 is an LCD.

An editing screen 571 that is displayed on the display portion 57 will be explained with reference to FIG. 2. A template 20 shows a print image that is to be printed on the tape by the printer 4. Printing based on the template 20 is referred to as template printing. The editing screen 571 is displayed when an application that allows creation and editing of the template 20 is executed by the CPU 51 of the PC 5. The editing screen 571 includes a first area 571A, a second area 571B and a third area 571C. Each of these will be explained below.

The template 20 is displayed in the first area 571A. The template 20 is formed by arranging a plurality of objects ("22A" etc. in FIG. 2) inside a specific area 21. The "objects" are print target images (a character string and the like) to be printed on a label created in accordance with the template 20. In the case of FIG. 2, the object 22A that includes a character string "Pork back ribs," an object 22B that includes a barcode 221, an object 22C that includes a character string "Price (yen)" and an object 22D that includes numerals "300" are arranged inside the area 21. In accordance with an input operation on the input portion 56, the CPU 51 can change the category of the objects arranged inside the area 21, move the positions of the objects 22A to 22D arranged inside the area 21 and so on. Thus, by performing an input operation on the input portion 56 while viewing the template 20, a user can adjust the print image to be printed on the tape.

Figure 3:
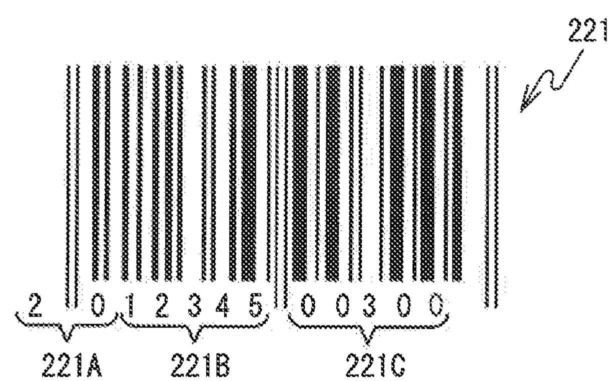
FIG. 3 is a diagram showing a barcode.

Note that the barcode 221 that is included in the object 22B is a code (an in-store code) that a store or the like can freely designate. For example, the in-store code is used for price lists for fresh food products, membership authentication for point cards and so on. The in-store code is used only in that store and is not shared by another store. As shown in FIG. 3, the barcode 221 includes a category 221A "20" of a target product, a product code 221B "12345" and a price 221C "00300."

Figure 2:
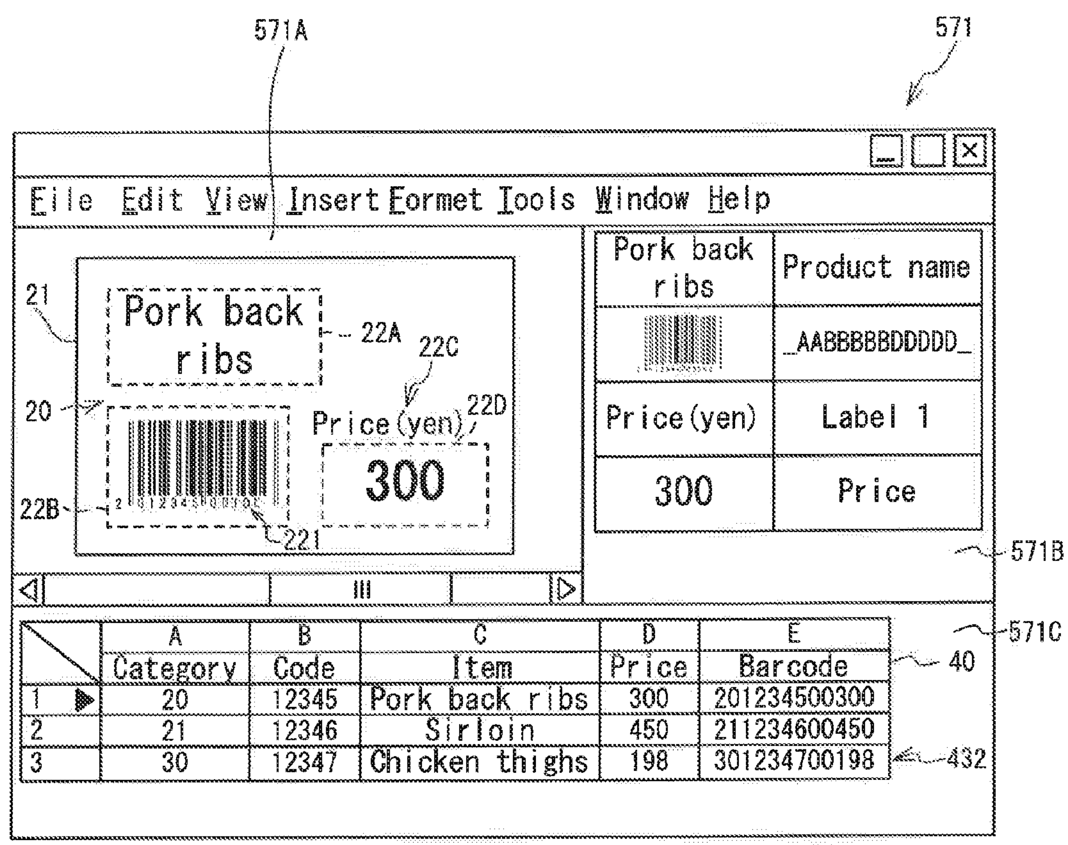
FIG. 2 is a diagram showing an editing screen displayed on a display portion of the PC.

As shown in FIG. 2, a character string, numerals, a barcode and a name of each of the objects (hereinafter referred to as an object name) included respectively in the objects 22A to 22D arranged in the area 21 of the template 20 are displayed in the second area 571B. In the case of FIG. 2, "Pork back ribs" and the object name "Product name" corresponding to the object 22A, the barcode 221 and the object name "_AABBBBBDDDDD_" corresponding to the object 22B, "Price (yen)" and the object name "Label 1" corresponding to the object 22C, and "300" and the object name "Price" corresponding to the object 22D are displayed. The object names are set by the user when the objects included in the area 21 of the template 20 are set by the user.

A table 40, which shows the DB file 432 that can be linked to the template 20, is displayed in the third area 571C. In the topmost row of the table 40, "A," "B," "C," "D" and "E" are respectively information (hereinafter referred to as a "field ID") that identifies respective corresponding columns (hereinafter also referred to as "fields") of the DB file 432. "Category," "Code," "Item," "Price" and "Barcode" that are to the lower side of the field IDs respectively show names of the fields (hereinafter also referred to as "field names"). The leftmost column ("1," "2," "3") shows row numbers. The data of the DB file 432 for one row corresponds to a record. A triangle allocated to the row number "1" indicates that the record of the corresponding row number is selected. By performing an operation, on the input portion 56, to select a specific field of a specific record and input a value, the user can change the specific data of the DB file 432.

In the meantime, of the DB file 432, data of the field ID “E” (the field name “Barcode”) is generated by combining, in order, two digits of data of the field ID “A” (the field name “Category”), 5 digits of data of the field ID “B” (the field name “Code”) and 5 digits of data of the field ID “D” (the field name “Price”). Thus, for example, if the data of the row number “1” and the field ID “D” (the field name “Price”) is changed from “300” to “450,” the CPU 51 changes the data of the row number “1” and the field ID “E” (the field name “Barcode”) from “201234500300” to “201234500450.”

The user can perform settings to link a specific field of the DB file 432 to the objects 22A to 22D included in the area 21 of the template 20. In the case of FIG. 2, the field ID “C” (the field name “Item”) of the DB file 432 is linked to the object 22A (the object name “Product name”). The field ID “E” (the field name “Barcode”) of the DB file 432 is linked to the object 22B (the object name “_AABBBBBDDDDD_”). The field ID “D” (the field name “Price”) of the DB file 432 is linked to the object 22D (the object name “Price”).

An example will be given of a case in which the data of the template 20 that is set in the above-described manner (hereinafter referred to as the “template data 431”) and the CSV file of the DB file 432 are transmitted to the printer 4. In this case, the CPU 41 of the printer 4 stores the received template data 431 and the CSV file in the flash ROM 43. Based on the template data 431, the CPU 41 can generate a plurality of print images in which, of the CSV file, each of a plurality of data corresponding to the field ID “C” is arranged in the position of the object 22A, each of a plurality of data corresponding to the field ID “E” is arranged in the position of the object 22B and each of a plurality of data corresponding to the field ID “D” is arranged in the position of the object 22D. As a result, by using the template printing, the user can cause the printer 4 to print a plurality of differing print images, simply by creating the single template 20 using the PC 5.

More specifically, a first print image is generated in which “Pork back ribs,” “201234500300 (barcode)” and “300” corresponding to the row number “1” and the field IDs “C,” “E” and “D” are arranged in the positions of the objects 22A, 22B and 22D inside the area 21. Further, a second print image is generated in which “Sirloin,” “211234600450 (barcode)” and “450” corresponding to the row number “2” and the field IDs “C,” “E” and “D” are arranged. In addition, a third print image is generated in which “Chicken thighs,” “301234700198 (barcode)” and “198” corresponding to the row number “3” and the field IDs “C,” “E” and “D” are arranged.

Hereinafter, each of the plurality of data included in the CSV file is referred to as the “object data.” The object data in which the plurality of object data are combined (namely, the object data of the field ID “E”) is referred to as the “combined object data” and the other object data (the object data of the field IDs “A” to “D”) are referred to as “single object data.” Each of the objects (the objects 22A and 22D) linked to the single object data is referred to as a “single object.” The object (the object 22B) linked to the combined object data is referred to as a “combined object.”

Figure 4:
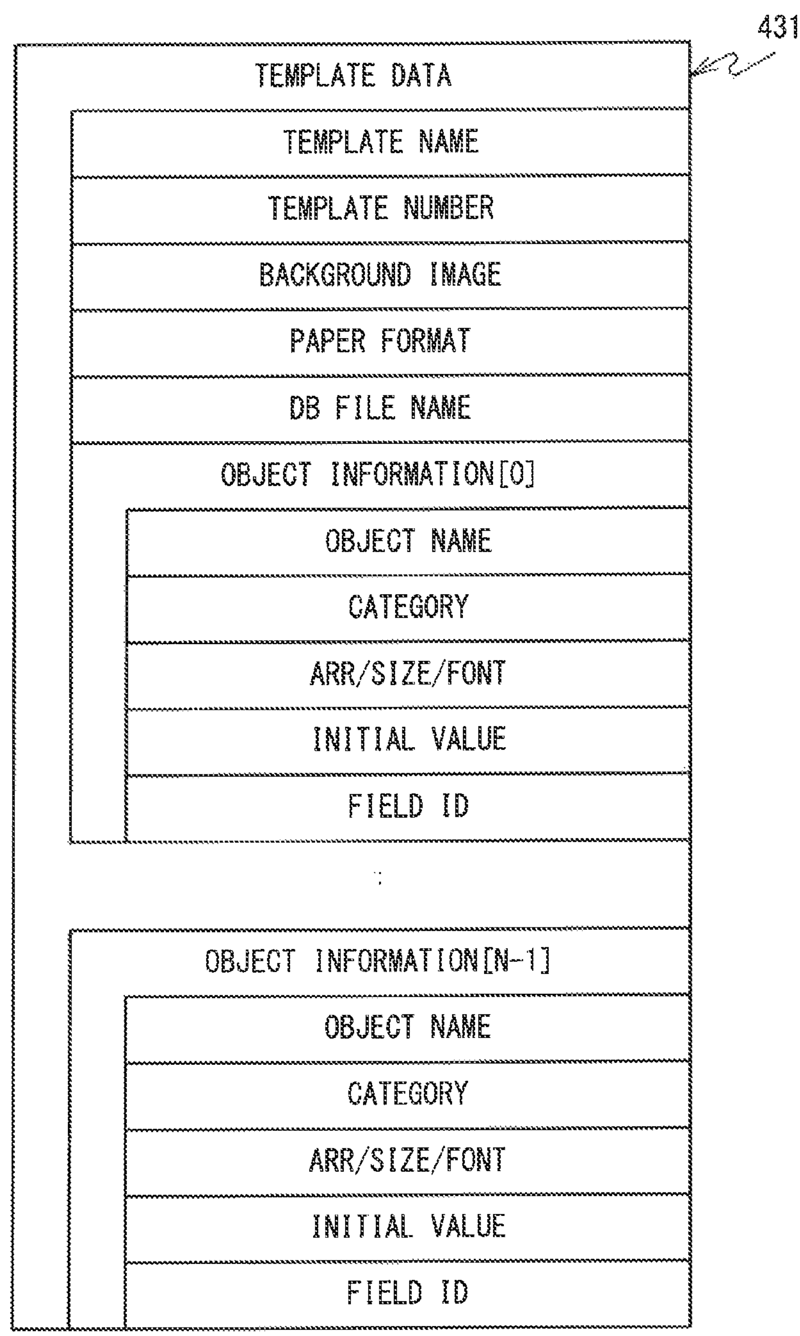
FIG. 4 is a diagram showing template data.

FIG. 4 shows the template data 431 that is transmitted to the printer 4 from the PC 5. The single template data 431 is created in accordance with the template 20 created via the editing screen 571 (refer to FIG. 2). The template data 431 includes a template name, a template number, a background image, a paper format, a DB file name and a plurality of pieces of object information. The plurality of pieces of object information correspond to the number of the objects 22A to 22D included in the area 21 of the template 20. The pieces of object information respectively include the object name, a category, an arrangement/size/font, an initial value and the field ID. Hereinafter, the plurality of pieces of object information are respectively referred to as pieces of object information [0] to [N−1] (N is a maximum number of the pieces of object information, and in the case of the template 20 shown in FIG. 2, N=4).

The template name is a name of the template data 431. The template number is an identification number indicating the template data 431. The template number is a value that is assigned each time the template data 431 is created by the PC 5, starting from 1 and adding 1 each time. The background image shows a background image of the print image that is generated based on the template data 431. The paper format indicates a type of tape on which the print image is to be printed. The DB file name is a file name of the CSV file of the DB file 432 that is linked to the objects 22A, 22B and 22D of the template 20.

The respective pieces of object information [0] to [N−1] include information corresponding to the objects 22A to 22D, respectively. The category indicates a category of the corresponding object. Specific examples of the category of the object include “Date,” “Price,” “Product name,” “Barcode” and “Graphic” etc. The arrangement indicates the position of the object inside the area 21. The size indicates a size of the object. The font indicates a font of the character string and numerals when the data included in the object is a character string or numerals. The initial value indicates an initial value of the object. The field ID indicates the field ID of the linked field, of the CSV file of the DB file 432. Note that the field ID is not included in the object information corresponding to the object 22C, for which the link is not set.

The printer 4 has a function to edit CSV data stored in the flash ROM 43. An editing screen 60 (refer to FIG. 5) that is displayed on the display portion 47 when the editing of the CSV file is performed by the printer 4 will be explained. Hereinafter, it is assumed that a plurality of the template data 431 and the CSV data linked to the plurality of template data 431 are received and stored in the flash ROM 43.

Figure 6:
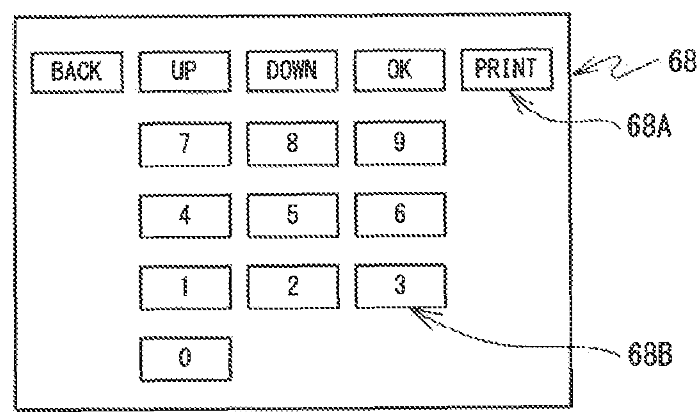
FIG. 6 is a diagram showing a one-touch panel.

It should be noted that, when the editing of the CSV file is performed by the printer 4, a one-touch panel 68 shown in FIG. 6 is placed on the input portion 46 (refer to FIG. 1). A plurality of command buttons 68A (“BACK,” “UP,” “DOWN,” “OK” and “PRINT” buttons) and ten-key buttons 68B (“0” to “9” buttons) are drawn on the one-touch panel 68. In a state in which the one-touch panel 68 is placed on the input portion 46, when the user performs a touch operation from the upper side of the one-touch panel 68, the input portion 46 can detect a position that has been touched. Based on the position detected by the input portion 46 and the positions of the plurality of command buttons 68A and the ten-key buttons 68B on the one-touch panel 68, the CPU 41 can identify which of the plurality of buttons has been touched.

Figure 5:
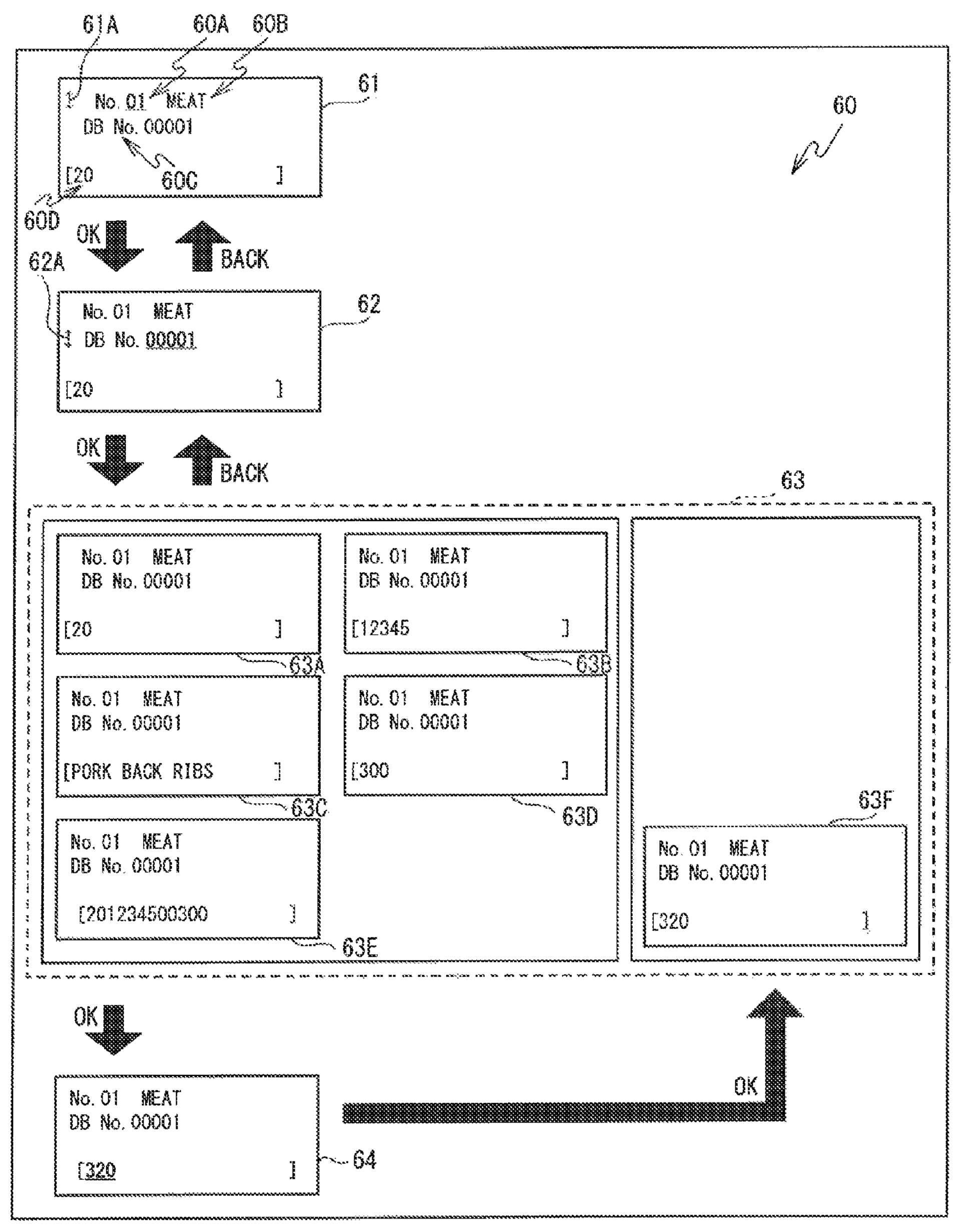
FIG. 5 is a diagram showing an editing screen displayed on a display portion of the printer.

As shown in FIG. 5, as the editing screen 60, one of an idle screen 61, a record selection screen 62, a field selection screen 63 and an object editing screen 64 is displayed. A template number 60A, a template name 60B, a row number 60C and an object data 60D are included in each of the screens. As the template number 60A and the template name 60B, the template number and the template name of one of the plurality of template data 431 stored in the flash ROM 43 are displayed. As the row number 60C, a number of a specific row from a plurality of rows when the CSV file is shown in a tabular format is displayed. As the object data 60D, one of the plurality of object data of the row of the CSV file indicated by the row number is displayed.

Hereinafter, the "row (or record) when the CSV file is shown in the tabular format" can be referred to as the "row (or record) of the CSV file." The "column (or field) when the CSV file is shown in the tabular format" can be referred to as the "column (or field) of the CSV file." As IDs that identify each of the plurality of columns of the CSV file, the field IDs are used. "A," "B", "C" . . . , or "1," "2," "3" . . . are displayed as the field IDs. The field IDs "A" and "1," "B" and "2," and "C" and "3" . . . each indicate a column of the same CSV file.

When the editing of the CSV file is started, first, the idle screen 61 is displayed on the display portion 47. On the idle screen 61, an initial value "01" is displayed as the template number 60A and an initial value "00001" is displayed as the row number 60C. Further, a template name "Meat," which corresponds to the initial value "01" of the template number 60A, is displayed as the template name 60B. Object data "20" (refer to FIG. 2) that corresponds to the row number "1" and the field ID "A" of the CSV file is displayed as the object data 60D.

The idle screen 61 is a screen on which the template number 60A can be selected. In the case of the idle screen 61, in order to indicate that the template number 60A can be selected, the template number 60A is underlined. Further, to the left side of the template number 60A, an arrow 61A is displayed that indicates that the template number 60A can be selected. In this state, when the "DOWN" button is touched by the user, the template number 60A is changed from "01" to "02." In this case, the template name 60B changes to the template name corresponding to the template number 60A "02" following the change. The initial value "00001" is displayed as the row number 60C. Object data that corresponds to the row number "1" and the field ID "A" of the CSV file is displayed as the object data 60D.

If the "OK" button is touched in a state in which the idle screen 61 is displayed, the record selection screen 62 is displayed. The record selection screen 62 is a screen on which the row number 60C can be selected. In the case of the record selection screen 62, in order to indicate that the row number 60C can be selected, the row number 60C is underlined. Further, to the left side of the row number 60C, an arrow 62A is displayed that indicates that the row number 60C can be selected. In this state, when the "DOWN" button is touched by the user, the row number 60C is changed from "00001" to "00002." In this case, the template number 60A "01" and the template name 60B "Meat" are not changed. Object data "21" (refer to FIG. 2) that corresponds to the row number "2" and the field ID "A" of the CSV file is displayed as the object data 60D.

If the "OK" button is touched in the state in which the record selection screen 62 is displayed, the field selection screen 63 (specifically, field selection screens 63A to 63E) is displayed. The field selection screen 63 is a screen on which the field ID can be selected. If the "DOWN" button is touched by the user in the state in which the field selection screen 63A is displayed, the field column is changed from "A" to "B." In this case, the template number 60A "01," the template name 60B "Meat" and the row number 60C "00001" are not changed. Single object data "12345" (refer to FIG. 2) that corresponds to the row number "1" and the field ID "B" of the CSV file is displayed as the object data 60D (the field selection screen 63B). If the "DOWN" button is touched by the user in the state in which the field selection screen 63B is displayed, the field column is changed from "B" to "C." The object data "Pork back ribs" (refer to FIG. 2) that corresponds to the row number "1" and the field ID "C" of the CSV file is displayed as the object data 60D (the field selection screen 63C).

Each time the "DOWN" button is touched by the user, the field column is changed in sequence to "D" and to "E." As the object data 60D, the object data "300" (the field selection screen 63D) (refer to FIG. 2) that corresponds to the row number "1" and the field ID "D" of the CSV file and the object data "201234500300" (the field selection screen 63E) (refer to FIG. 2) that corresponds to the row number "1" and the field ID "E" are displayed.

An example will be given of a case in which the "OK" button is touched in the state in which the field selection screen 63D is displayed. In this case, the object editing screen 64 is displayed. The object editing screen 64 is a screen that is used to edit the object data of the CSV file that is displayed as the object data 60D. In the case of the object editing screen 64, in order to indicate that the object data 60D can be edited, the object data 60D is underlined.

A case will be explained in which the "3," "2" and "0" buttons are touched in sequence. "300" that is displayed as the object data 60D on the object editing screen 64 is changed to "320." If the "OK" button is touched in this state, a field selection screen 63F is displayed. Further, the object data that corresponds to the row number "1" and the field ID "D" of the CSV file is changed from "300" to "320." On the field selection screen 63F, "320" following the change is displayed as the object data 60D.

In this case, it should be noted that the object data corresponding to the field ID "E" of the CSV file is combined object data that is generated by combining the single object data of the field IDs "A," "B," and "D." Therefore, when the object data of the field ID "D" is changed from "300" to "320," the object data of the field ID "E" also needs to be changed from "201234500300" to "201234500320." However, information that indicates that the object data of the field ID "E" is the combined object data is not included in the CSV file. Therefore, the CPU 41 cannot identify the combined object data based on the CSV file itself.

In contrast to this, based on the configuration of the object name "_AABBBBBDDDDD_" of the object 22B that is linked with the field ID "E" of the CSV file, the CPU 41 of the present embodiment determines that the corresponding object is the combined object. More specifically, the CPU 41 identifies the object name of the object linked with the object data that is the target of editing in the CSV file, and when the identified object name starts and ends with "_", the CPU 41 determines that the corresponding object is the combined object.

In addition, based on the configuration of the object name "_AABBBBBDDDDD_", the CPU 41 determines the respective fields of the plurality of single object data that form the basis of the combined object data. More specifically, the following is performed. The CPU 41 extracts the configuration "AABBBBBDDDDD" of the object name, excluding the "_". Of the extracted configuration, the first and second characters from the start both match the field ID "A" and the CPU 41 therefore determines that the first and second characters of the combined object data correspond to the single object data of the field ID "A" in the CSV file. Further, the third to seventh characters all match the field ID "B" and the CPU 41 therefore determines that the third to seventh characters of the combined object data correspond to the single object data of the field ID "B" in the CSV file. In addition, the eighth to twelfth characters all match the field ID "D" and the CPU 41 therefore determines that the eighth to twelfth characters of the combined object data correspond to the single object data of the field ID "D" in the CSV file.

By performing the determination in the above-described manner, the CPU 41 can generate the combined object data that reflects a change content when one of the plurality of single object data that is the basis of the combined object data is changed. Further, as will be explained in detail later, the CPU 41 can also reflect a change content in the plurality of single object data that form the basis of the combined object data when the combined object data is changed. The user can cause the printer 4 to recognize the combined object data of the CSV file, by determining, in accordance with the above-described rules, the object name that can be set for each object via the editing screen 571.

Note that the function to set the object names of the objects 22A to 22D included in the template 20, is incorporated in a known application that can create the template 20. Further, the object names are normally included in the object information of the template data that is transmitted to the printer 4 from the PC 5. Therefore, the CPU 41 of the printer 4 can recognize the combined object data based on the template data corresponding to the template 20 that is created directly using the known application. As a result, when the user causes the printer 4 to recognize the combined object data, the known application can be used directly and it is not necessary to use a special application.

Figure 7:
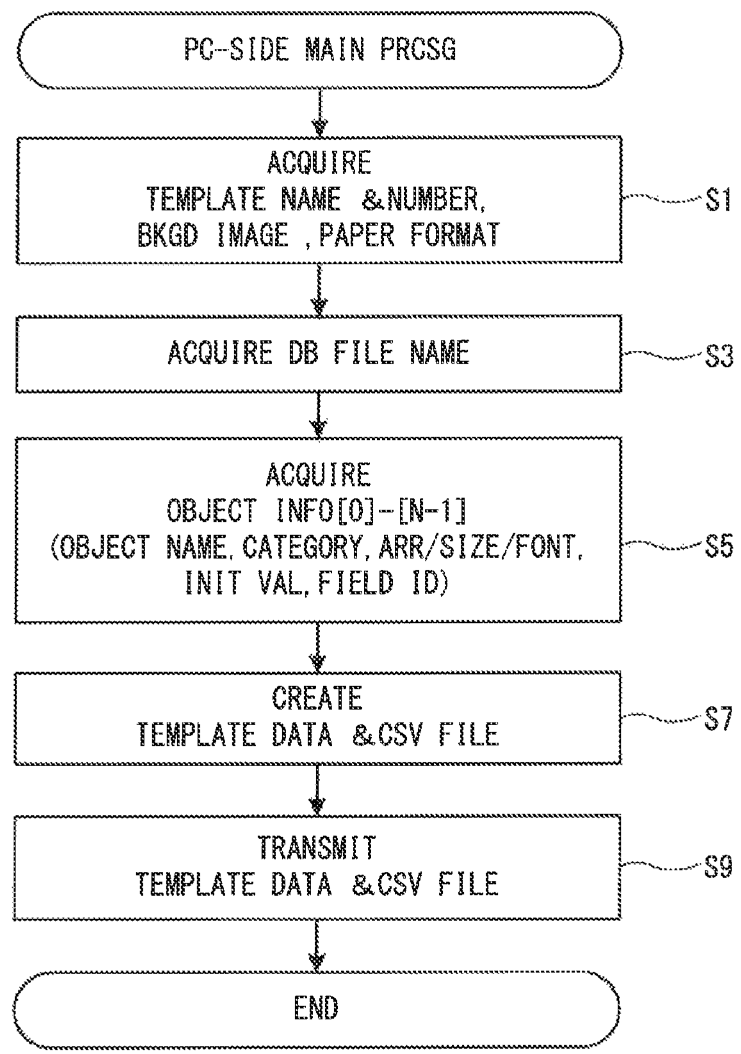
FIG. 7 is a flowchart of PC-side main processing.

Processing performed by the CPU 51 of the PC 5 will be explained with reference to FIG. 7. In the following explanation, "S" is an abbreviation of "step." PC-side main processing is started by the CPU 51 executing a program stored in the HDD 54 when an operation has been detected, via the input portion 56, to transmit the template data 431 of the template 20 created via the editing screen 571 (refer to FIG. 2) and the CSV file of the DB file 432 to the printer 4.

Processing at S1 is as follows. The CPU 51 acquires the name of the template 20 created via the editing screen 571 as the template name. The CPU 51 acquires the number of the created template 20 as the template number. The CPU 51 acquires the background image of the set area 21 as the background image. The CPU 51 acquires the type of the tape that is the set printing target as the paper format. The CPU 51 stores the acquired template name, template number, background image and paper format in the RAM 52.

The CPU 51 acquires a file name of the CSV file of the DB file 432 linked to the template 20 as the DB file name (S3). The CPU 51 stores the acquired DB file name in the RAM 52.

The CPU 51 acquires the pieces of object information respectively corresponding to the objects 22A to 22D included in the template 20 (S5). More specifically, the following processing is performed. The CPU 51 acquires "Product name," "_AABBBBBDDDDD_", "Label 1" and "Price" as the object names corresponding to the objects 22A to 22D. The CPU 51 acquires "Character string," "Barcode," "Character string" and "Monetary amount" as the categories corresponding to the objects 22A to 22D. The CPU 51 acquires coordinate information that can identify the positions of the objects 22A to 22D inside the area 21 (refer to FIG. 2) as the arrangement corresponding to the objects 22A to 22D. The CPU 51 acquires lengths in the vertical and horizontal directions of the objects 22A to 22D as the sizes corresponding to the objects 22A to 22D. The CPU 51 acquires fonts of "Pork back ribs," "Price (yen)" and "300" included in the objects 22A, 22C and 22D as the fonts corresponding to the objects 22A, 22C and 22D. The CPU 51 acquires "Pork back ribs," "201234500300 (barcode)," "Price (yen)" and "300" included in the objects 22A to 22D displayed in the first area 571A as the initial values corresponding to the objects 22A to 22D. The CPU 51 acquires the field IDs "C," "E" and "D" as the field IDs corresponding to the objects 22A, 22B and 22D. The CPU 51 stores the pieces of object information [0] to [N−1 (N=4)] of the acquired objects 22A to 22D in the RAM 52.

The CPU 51 reads out, from the RAM 52, the above-described data acquired by the processing at S1, S3 and S5. The CPU 51 creates the template data 431 (refer to FIG. 4) that includes the data read out from the RAM 52 (S7). The CPU 51 creates the CSV file of the DB file 432 (refer to FIG. 2) (S7). The CPU 51 transmits the created template data 431 and CSV file to the printer 4 via the cable 3 (S9). The CPU 51 ends the PC-side main processing.

Printer-side first main processing (refer to FIG. 8), printer-side second main processing (refer to FIG. 9) and printer-side third main processing (refer to FIG. 10 to FIG. 26) will be explained with reference to FIG. 8 to FIG. 26. The printer-side first main processing, the printer-side second main processing and the printer-side third main processing are executed in parallel by the CPU 41 of the printer 4. In the following explanation, it is assumed that a plurality of the template data (template number "1," "2," . . . ) and the one CSV file are stored in the flash ROM 43. Further, it is assumed that the file name of the one CSV file is included as the DB file name of all the plurality of template data.

In the printer-side first main processing to the printer-side third main processing, the CPU 41 uses integer type variables Tnum, Rnum and ObjNum, state information and flag information stored in the RAM 42. Tnum indicates the template number selected by the "UP" and "DOWN" buttons being touched. Rnum indicates the row number selected by the "UP" and "DOWN" buttons being touched. ObjNum indicates, by a number, the field ID selected by the "UP" and "DOWN" buttons being touched. Depending on a state of the printer-side third main processing, one of idle "0," record selection "1," field selection "2" and object editing "3" is set as the state information. Further, the CPU 41 uses integer-type variables num, Digit, FiedNum, Fnum, count1, count2, count3, count4, count5 and count6 that are stored in the RAM 42. In addition, the CPU 41 uses character-type variables Result, ObjName, Char, TempValue and fval that are stored in the RAM 42.

Furthermore, as will be explained in detail later, as a character-type variable, "object information [m]. object data (m=0, 1, . . . N−1)" is stored in the RAM 42. Object data is stored for each of the objects, as the "object information [m]. object data (m=0, 1, . . . N−1)". The "object information [m]. object data (m=0, 1, . . . N−1)" is referred to when the print image is created.

Hereinafter, the template data of the template number Tnum is referred to as the template data [Tnum]. The record of the row number Rnum in the CSV file is referred to as the record [Rnum]. Of the CSV file read from the flash ROM 43 and stored in the RAM 42, the object data of the row number Rnum and the field ID ObjNum is referred to as CSV [Rnum] [ObjNum]. When two of the field IDs are a target of comparison, "A" and "1," "B" and "2" and "C" and "3" etc. are respectively determined to be the same.

Figure 8:
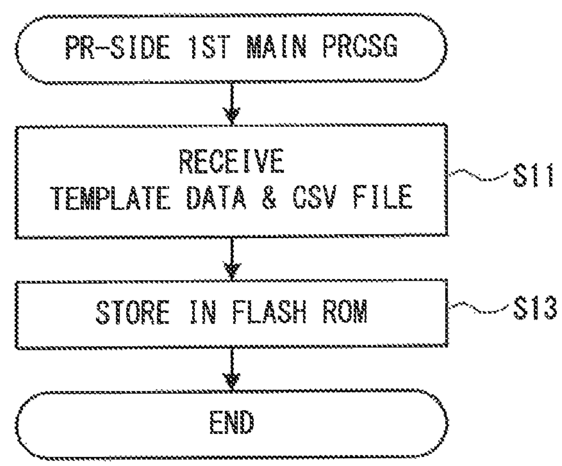
FIG. 8 is a flowchart of printer-side first main processing.

The printer-side first main processing performed by the CPU 41 of the printer 4 will be explained with reference to FIG. 8. The printer-side first main processing is processing to receive the template data 431 and CSV file transmitted from the PC 5 and store them in the flash ROM 43. The printer-side first main processing is started by the CPU 41 executing a program stored in the flash ROM 43, when the template data 431 and the CSV file are transmitted from the PC 5 connected via the cable 3. The CPU 41 receives the template data 431 and the CSV file transmitted from the PC 5 (S11). The CPU 41 stores the received template data 431 and CSV file in the flash ROM 43 (S13). The CPU 41 ends the printer-side first main processing.

Figure 9:
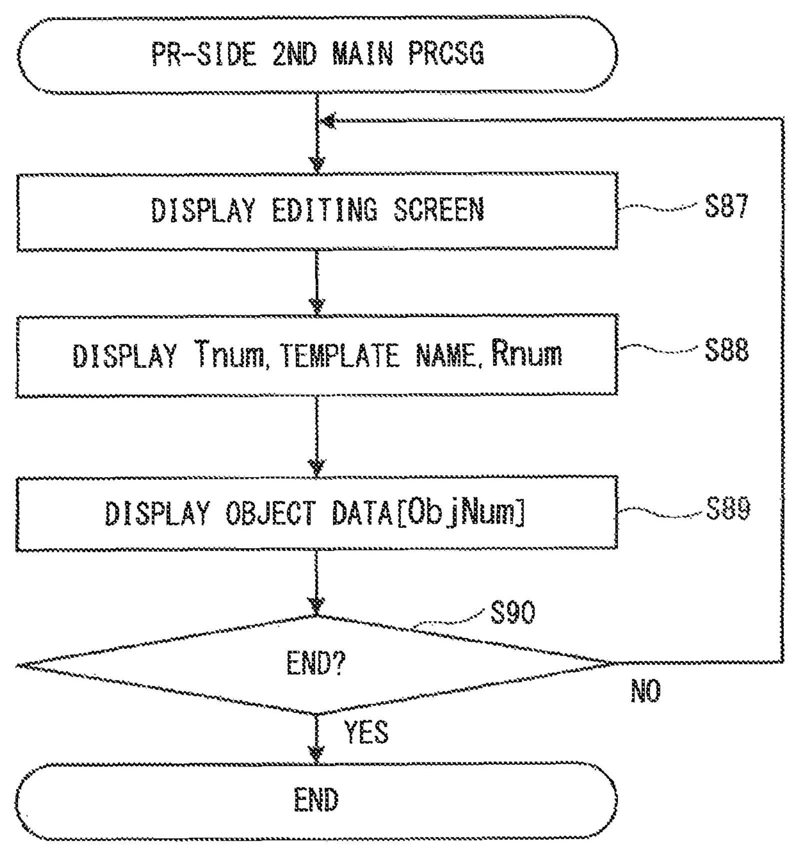
FIG. 9 is a flowchart of printer-side second main processing.

The printer-side second main processing that is performed by the CPU 41 of the printer 4 will be explained with reference to FIG. 9. The printer-side second main processing is processing that causes the editing screen 60 (refer to FIG. 5) to be displayed on the display portion 47, based on Tnum, Rnum, ObjNum and the state information. The printer-side second main processing is started by the CPU 41 executing a program stored in the flash ROM 43, when an operation to start the editing of the CSV file is performed via the input portion 46.

The CPU 41 causes the editing screen 60 to be displayed on the display portion 47 in accordance with the state information (S87). Specifically, the CPU 41 displays the idle screen 61 when the state information is idle "0." The CPU 41 displays the record selection screen 62 when the state information is record selection "1." The CPU 41 displays the field selection screen 63 when the state information is field selection "2." The CPU 41 displays the object editing screen 64 when the state information is object editing "3."

The CPU 41 displays Tnum as the template number 60A. As the template name 60B, the CPU 41 displays the template name included in the template data (the template data [Tnum]) that has been read out from the flash ROM 43 and stored in the RAM 42. The CPU 41 displays Rnum as the row number 60C (S88). The CPU 41 displays CSV [Rnum] [ObjNum] as the object data 60D (S89).

The CPU 41 determines whether or not an operation to end the editing of the CSV file has been performed via the input portion 46 (S90). When the CPU 41 determines that the operation to end the editing has not been performed (no at S90), the CPU 41 returns the processing to S87. When the CPU 41 determines that the operation to end the editing has been performed (yes at S90), the CPU 41 ends the printer-side second main processing.

The printer-side third main processing that is performed by the CPU 41 of the printer 4 will be explained with reference to FIG. 10 to FIG. 26. The printer-side third main processing is started by the CPU 41 executing a program stored in the flash ROM 43, when an operation to start the editing of the CSV file is performed via the input portion 46.

The CPU 41 initializes Tnum, Rnum and ObjNum by setting them to 1 (S21). The reason for the initialization is to display the template number 60A "01 (=Tnum)," the row number 60C "00001 (=Rnum)" and the object data 60D "CSV [1 (=Rnum)] [1 (=ObjNum)]" on the first screen (the idle screen 61, refer to FIG. 5) of the editing screen 60.

The CPU 41 performs template switching processing (S23). The template switching processing is processing to acquire the template data [Tnum] and to acquire, from the CSV file, the object data ("object information [0]. object data" to "object information [N−1]. object data") respectively corresponding to the pieces of object information [0] to [N−1] of the template data [Tnum].

The template switching processing will be explained with reference to FIG. 11. In order to acquire the template data [Tnum], the CPU 41 performs template load processing (S31).

The template load processing will be explained with reference to FIG. 12. The CPU 41 reads the template data [Tnum] from the flash ROM 43 and stores the template data [Tnum] in the RAM 42 (S41). The CPU 41 initializes Rnum and ObjNum by setting them to 1 (S43). The reason for the initialization is to constantly display CSV [1 (=Rnum)] [1 (=ObjNum)] as the object data 60D of the editing screen 60, when Tnum is changed and the template data is newly read out (for example, when the template switching processing is performed by processing at S141 (refer to FIG. 18)). The CPU 41 ends the template load processing and returns the processing to the template switching processing (refer to FIG. 11).

Figure 11:
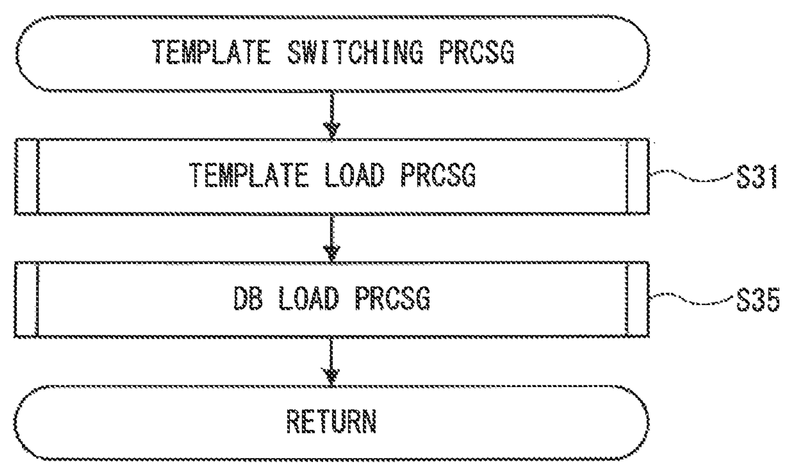
FIG. 11 is a flowchart of template switching processing.
Figure 12:
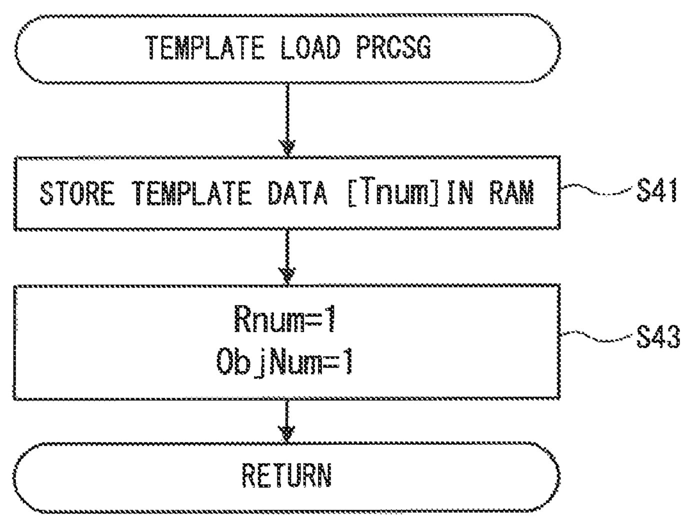
FIG. 12 is a flowchart of template load processing.

As shown in FIG. 11, after performing the template load processing by the processing at S31, the CPU 41 performs DB load processing (S35). The DB load processing is processing to acquire the object data corresponding to the field IDs included respectively in the pieces of object information [0] to [N−1] of the template data [Tnum], of the data of the record [Rnum] of the CSV file.

Figure 13:
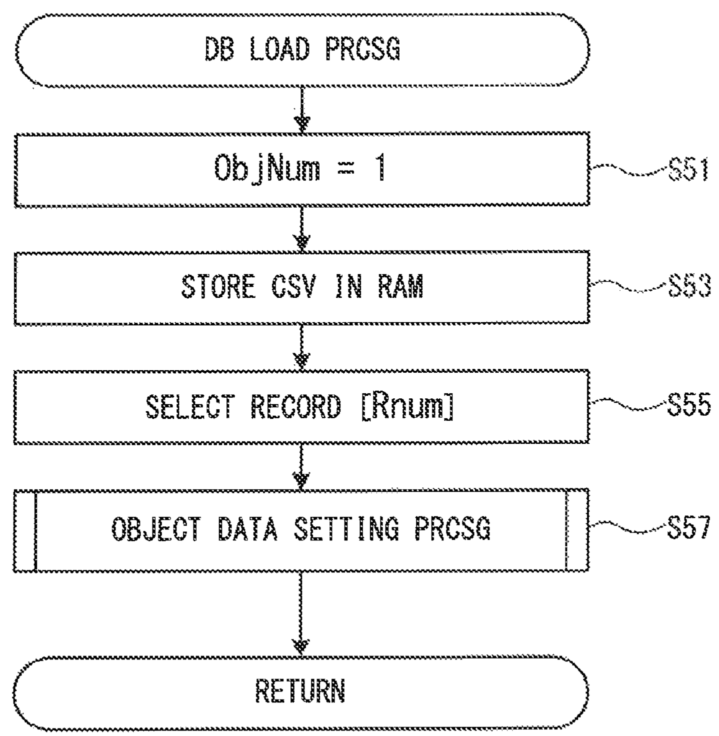
FIG. 13 is a flowchart of DB load processing.

The DB load processing will be explained with reference to FIG. 13. The CPU 41 initializes ObjNum by setting it to 1 (S51). The CPU 41 reads out the CSV file stored in the flash ROM 43 and stores it in the RAM 42 (S53). The CPU 41 selects the record [Rnum] of the CSV file stored in the RAM 42 (S55). The CPU 41 performs object data setting processing (S57). The object data setting processing is processing to decide, based on the record [Rnum] selected at S55, the object data corresponding to the field IDs respectively included in the pieces of object information [0] to [N−1] of the template data [Tnum].

The object data setting processing will be explained with reference to FIG. 14. The CPU 41 sets count1 to 0 (S61). The CPU 41 determines whether or not the number N of the pieces of object information [0] to [N−1] of the template data [Tnum] is larger than count1 (S63). When the CPU 41 determines that the number N of the pieces of object information [0] to [N−1] is larger than count1 (yes at S63), the CPU 41 determines whether or not the field ID is included in the object information [count1] (S65).

When the CPU 41 determines that the field ID is included (yes at S65), the CPU 41 performs combined object check processing (refer to FIG. 15), in order to determine whether or not the object corresponding to the object information [count1] is the combined object (S67). The object name included in the object information [count1] is set as a parameter for the combined object check processing.

The combined object check processing will be explained with reference to FIG. 15. The CPU 41 determines whether or not the object name of the parameter starts and ends with "_" (S81). When the CPU 41 determines that the object name starts and ends with "_" (yes at S81), the CPU 41 determines that the object corresponding to the object name is the combined object. The CPU 41 stores the flag information "0," which indicates that the object is the combined object, in the RAM 42 (S83). The CPU 41 returns the processing to the object data setting processing (refer to FIG. 14).

When the CPU 41 determines that the object name does not start and end with "_" (no at S81), the CPU 41 determines that the object corresponding to the object name is not the combined object. The CPU 41 stores the flag information "−1," which indicates that the object is not the combined object, in the RAM 42 (S85). The CPU 41 returns the processing to the object data setting processing (refer to FIG. 14).

Figure 14:
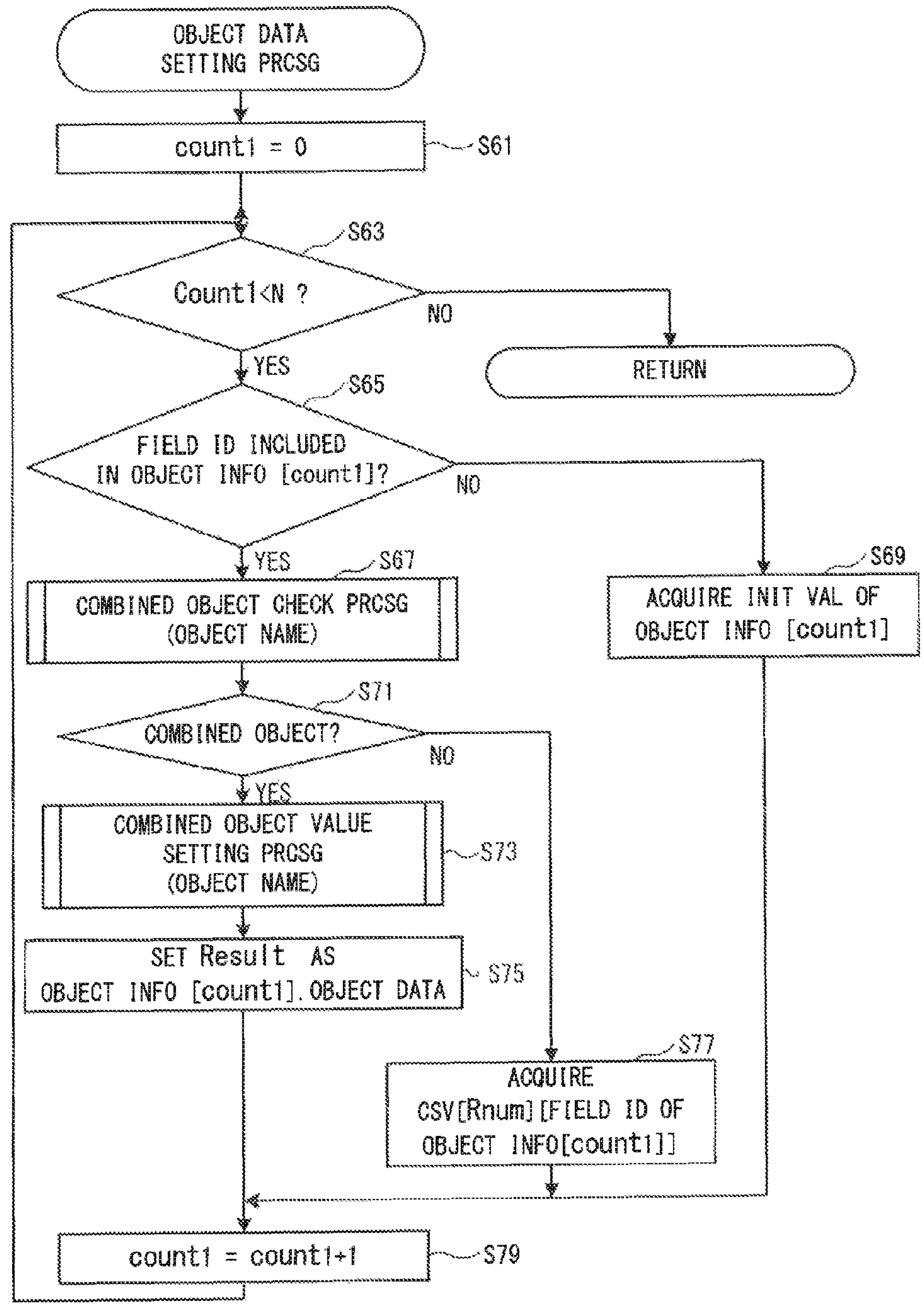
FIG. 14 is a flowchart of object data setting processing.
Figure 15:
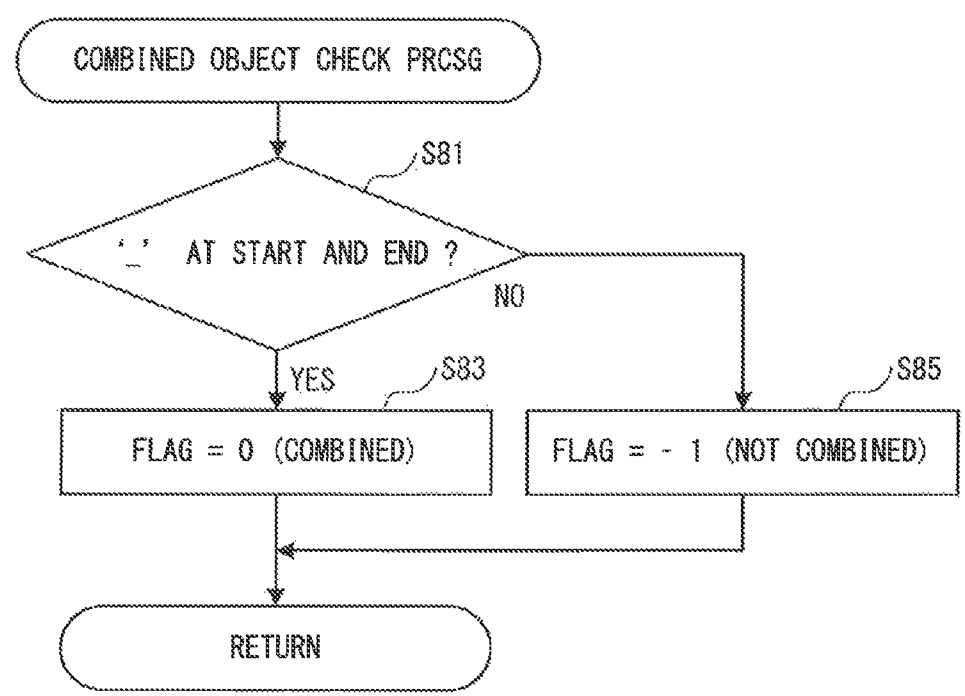
FIG. 15 is a flowchart of combined object check processing.

As shown in FIG. 14, after performing the combined object check processing (S67), based on the flag information stored in the RAM 42, the CPU 41 determines whether or not the object corresponding to the object information

[count1] is the combined object (S71). When the flag information "0" is stored, the CPU 41 determines that the object corresponding to the object information [count1] is the combined object (yes at S71). In order to generate the combined object data, the CPU 41 performs combined object value setting processing (refer to FIG. 16) (S73). The object name is set as a parameter for the combined object value setting processing.

Figure 16:
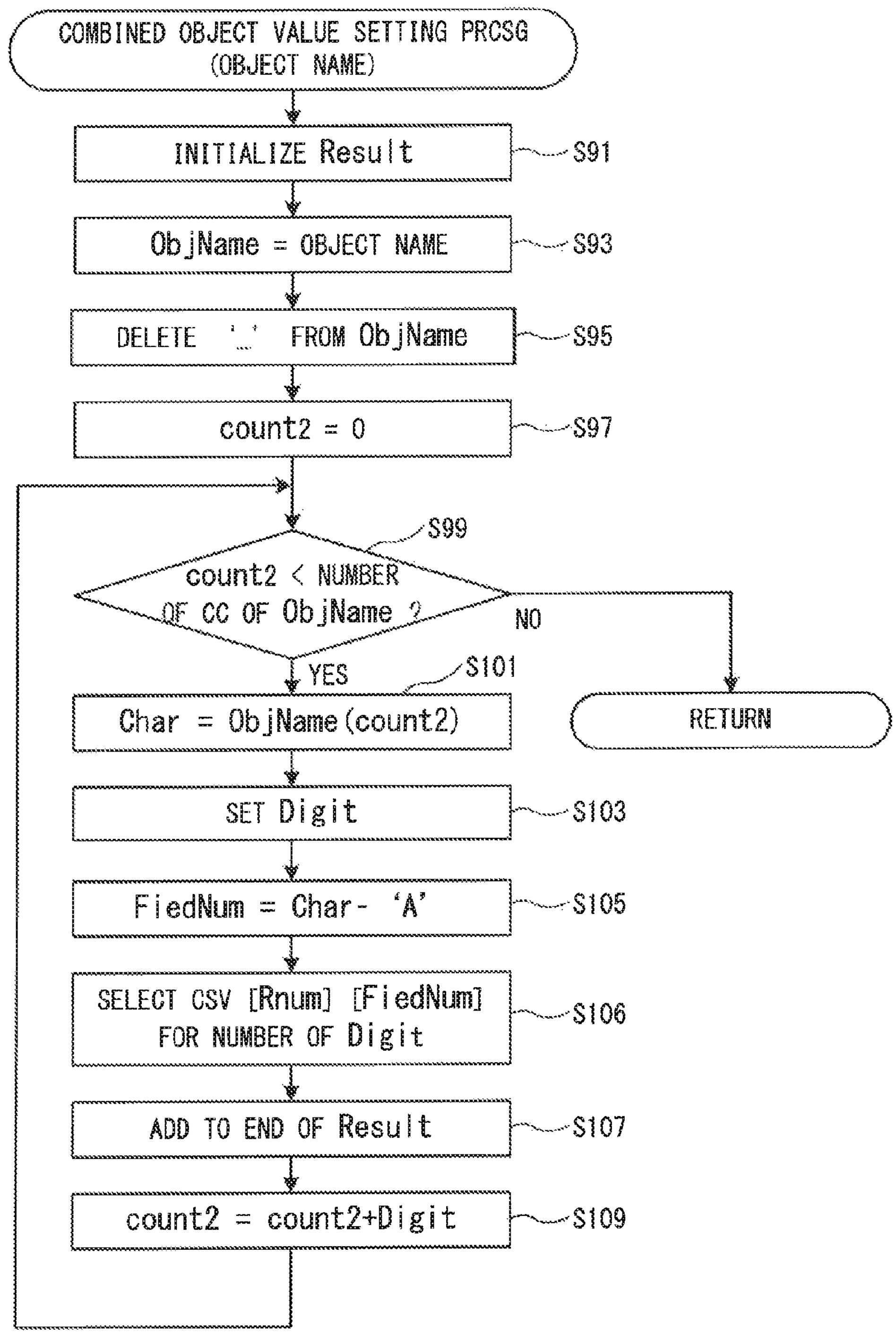
FIG. 16 is a flowchart of combined object value setting processing.

The combined object value setting processing will be explained with reference to FIG. 16. The CPU 41 sets "0x00" as Result and thus initializes Result (S91). The CPU 41 sets a character code of the object name of the parameter as ObjName (S93). The CPU 41 deletes "0x5F" which is the character code of "_" at the start and the end of ObjName (S95). The CPU 41 sets count2 to "0" (S97). The CPU 41 determines whether or not a number of character codes included in ObjName is greater than count2 (S99). When the CPU 41 determines that the number of character codes included in ObjName is greater than count2 (yes at S99), the CPU 41 advances the processing to S101.

Of ObjName, the CPU 41 sets the character code of "count2" (hereinafter referred to as ObjName(count2)) as Char (S101). When the same character code as the character code of ObjName(count2) continues from "count2+1"th onward, the CPU 41 identifies a number for which the same character code continues (hereinafter referred to as a continuous number). The CPU 41 sets the identified continuous number as Digit (S103). The CPU 41 subtracts the character code "0x41" of "A" from Char. The CPU 41 sets a result of the subtraction as the variable FiedNum (S105). Note that when Char is "A (0x41)," for example, FiedNum is "0," when Char is "B (0x42)," FiedNum is "1" and when Char is "C (0x43)," FiedNum is "2.

The CPU 41 selects the object data of CSV [Rnum] [FiedNum] and adds characters to the start so that a number of digits matches Digit (S106). For example, when the object data of CSV [Rnum] [FiedNum] is numerals, "0" is added to the start of the object data. The CPU 41 adds the object data, for which the number of digits has been adjusted to match Digit, to the end of Result (S107). The CPU 41 adds Digit to count2 and updates count2 (S109). The CPU 41 returns the processing to S99.

The processing is repeated and when the number of character codes included in ObjName is equal to or lower than count2, this means that all of the ObjName has been checked. When the CPU 41 determines that the number of character codes included in ObjName is not larger than count2 (no at S99), the CPU 41 ends the combined object value setting processing and returns the processing to the object data setting processing (refer to FIG. 14).

As shown in FIG. 14, after ending the combined object value setting processing (S73), the CPU 41 sets Result as the "object information [count1]. object data" (S75). The CPU 41 advances the processing to S79.

When the flag information "−1" is stored, the CPU 41 determines that the object corresponding to the object information [count1] is not the combined object (no at S71). In this case, the CPU 41 sets CSV [Rnum] [field ID included in the object information [count1]] as "object information [count1]. object data" (S77). The CPU 41 advances the processing to S79.

When the CPU 41 determines that the field ID is not included (no at S65), the CPU 41 sets the initial value included in the object information [count1] as "object information [count1]. object data" (S69). The CPU 41 advances the processing to S79.

The CPU 41 adds "1" to count1 and updates count1 (S79). The CPU 41 returns the processing to S63.

When the processing is repeated and the number of the pieces of object information is equal to or lower than count1, this means that the above-described processing has been performed with respect to all of the pieces of object information [0] to [N−1]. In this case, by the processing at S69, S75 and S77, a state is obtained in which the object data extracted from the record of the row number Rnum of the CSV file has been set for each of the "object information [0]. object data" to the "object information [N−1]. object data". When the CPU 41 determines that the number of pieces of object information is not larger than count1 (no at S63), the CPU 41 ends the object data setting processing and returns the processing to the DB load processing (refer to FIG. 13). As shown in FIG. 13, after ending the object data setting processing (S57), the CPU 41 returns the processing to the template switching processing (refer to FIG. 11). As shown in FIG. 11, after ending the DB load processing (S35), the CPU 41 ends the template switching processing and returns the processing to the printer-side third main processing (refer to FIG. 10).

Figure 10:
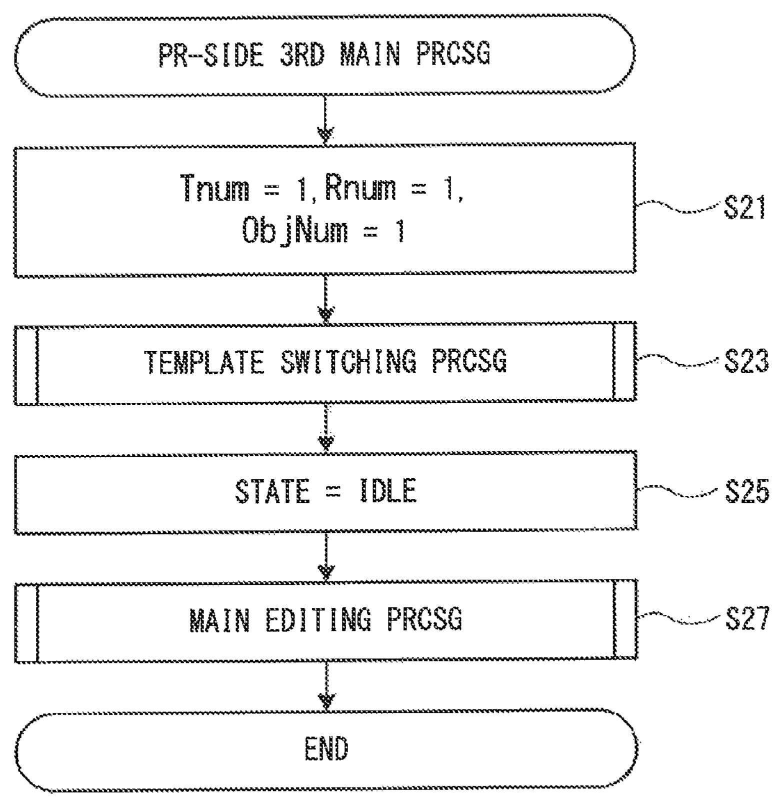
FIG. 10 is a flowchart of printer-side third main processing.

As shown in FIG. 10, after ending the template switching processing (S23), the CPU 41 sets idle "0" as the state information (S25). The CPU 41 performs main editing processing (refer to FIG. 17) (S27).

The main editing processing will be explained with reference to FIG. 17. In the main editing processing, the editing screen 60 is switched in accordance with an operation by the user, and editing of the CSV file is performed. Further, print processing is performed based on the "object information [0]. object data" to the "object information [N−1]. object data".

The CPU 41 determines whether or not idle "0" is set as the state information (S111). When the CPU 41 determines that idle "0" is set as the state information (yes at S111), the CPU 41 performs idle screen processing (refer to FIG. 18) (S113). The idle screen processing will be described in detail later. After ending the idle screen processing, the CPU 41 advances the processing to S127.

When the CPU 41 determines that record selection "1" is set as the state information (no at S111; yes at S115), the CPU 41 performs record selection screen processing (refer to FIG. 19) (S117). The record selection screen processing will be described in detail later. After ending the record selection screen processing, the CPU 41 advances the processing to S127.

When the CPU 41 determines that field selection "2" is set as the state information (no at S115; yes at S119), the CPU 41 performs field selection screen processing (refer to FIG. 20) (S121). The field selection screen processing will be described in detail later. After ending the field selection screen processing, the CPU 41 advances the processing to S127.

When the CPU 41 determines that object editing "3" is set as the state information (no at S119; yes at S123), the CPU 41 performs object editing screen processing (refer to FIG. 21) (S125). The object editing screen processing will be described in detail later. After ending the object editing screen processing, the CPU 41 advances the processing to S127. When the CPU 41 determines that a value other than "0" to "3" is set as the state information (no at S123), the CPU 41 advances the processing to S127.

The CPU 41 determines whether or not an operation to end the editing of the CSV file has been performed via the input portion 46 (S127). When the CPU 41 determines that the operation to end the editing has not been performed (no at S127), the CPU 41 returns the processing to S111. When the CPU 41 determines that the operation to end the editing has been performed (yes at S127), the CPU 41 returns the processing to the printer-side third main processing (refer to FIG. 10). As shown in FIG. 10, after ending the main editing processing (S27), the CPU 41 ends the printer-side third main processing.

Figure 18:
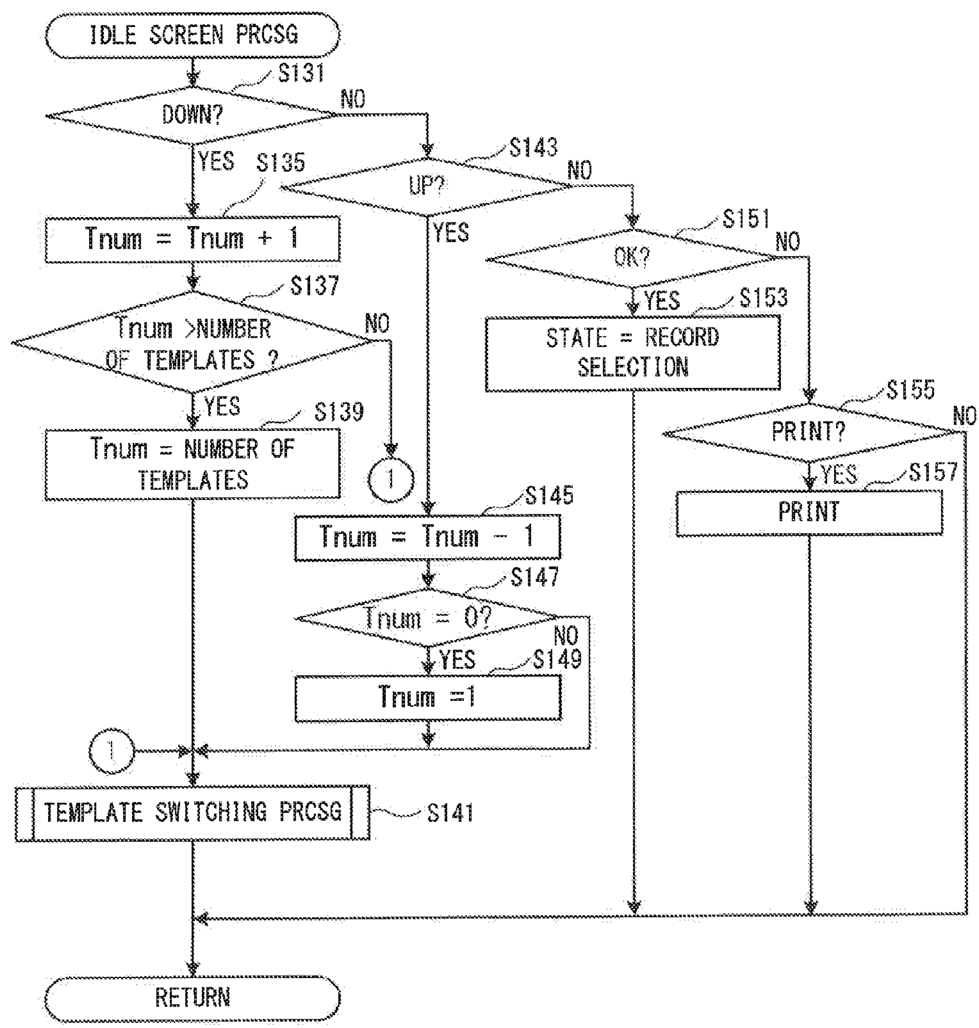
FIG. 18 is a flowchart of idle screen processing.

The idle screen processing will be explained with reference to FIG. 18. In the idle screen processing, when a touch operation is performed in a state in which the idle screen 61 (refer to FIG. 5) is displayed, corresponding processing is performed. The CPU 41 determines whether or not the "DOWN" button has been touched (S131). When the CPU 41 determines that the "DOWN" button has been touched (yes at S131), the CPU 41 adds "1" to Tnum (S135). The CPU 41 determines whether or not Tnum is larger than a total number of the pieces of template data stored in the flash ROM 43 (S137). When the CPU 41 determines that Tnum is larger than the total number of the pieces of template data (yes at S137), the CPU 41 sets the total number of the pieces of template data as Tnum, so that Tnum does not exceed the total number of the pieces of template data (S139). The CPU 41 advances the processing to S141.

The CPU 41 determines whether or not the "UP" button has been touched (no at S131; S143). When the CPU 41 determines that the "UP" button has been touched (yes at S143), the CPU 41 subtracts "1" from Tnum (S145). The CPU 41 determines whether or not Tnum is "0" (S147). When the CPU 41 determines that Tnum is "0" (yes at S147), the CPU 41 sets Tnum to "1" so that Tnum is constantly equal to or greater than "1" (S149). The CPU 41 advances the processing to S141. When the CPU 41 determines that Tnum is not "0" (no at S147), the CPU 41 advances the processing to S141.

Based on Tnum after the updating, the CPU 41 acquires the template data [Tnum] and performs the template switching processing (refer to FIG. 11) in order to acquire the object data (the "object information [0]. object data" to the "object information [N−1]. object data") respectively corresponding to the object information [0] to [N−1] of the template data [Tnum] from the CSV file (S141).

The template switching processing is the same as the template switching processing performed by the processing at S23 (refer to FIG. 10) and a detailed explanation thereof is therefore omitted here. By the template switching processing, the template data [Tnum] of Tnum after the updating is read out from the flash ROM 43 and is stored in the RAM 42. Further, the object data extracted from the record [Rnum] of the CSV file are set for each of the "object information [0]. object data" to the "object information [N−1]. object data". The CPU 41 ends the idle screen processing and returns the processing to the main editing processing (refer to FIG. 17).

The CPU 41 determines whether or not the "OK" button has been touched (no at S143; S151). When the CPU 41 determines that the "OK" button has been touched (yes at S151), the CPU 41 sets record selection "1" as the state information (S153). The CPU 41 ends the idle screen processing and returns the processing to the main editing processing (refer to FIG. 17).

The CPU 41 determines whether or not the "PRINT" button has been touched (no at S151; S155). When the CPU 41 determines that the "PRINT" button has been touched (yes at S155), the CPU 41 generates the print image in which each of the "object information [0]. object data" to the "object information [N−1]. object data" are arranged based on the arrangement/size/font in accordance with the category of each of the corresponding object information [0] to [N−1]. At that time, for example, for the object data for which the category is "barcode," a barcode indicating the corresponding object data (the combined object data) is generated and arranged. The CPU 41 prints the generated print image onto the tape (S157). The CPU 41 ends the idle screen processing and returns the processing to the main editing processing (refer to FIG. 17).

Figure 17:
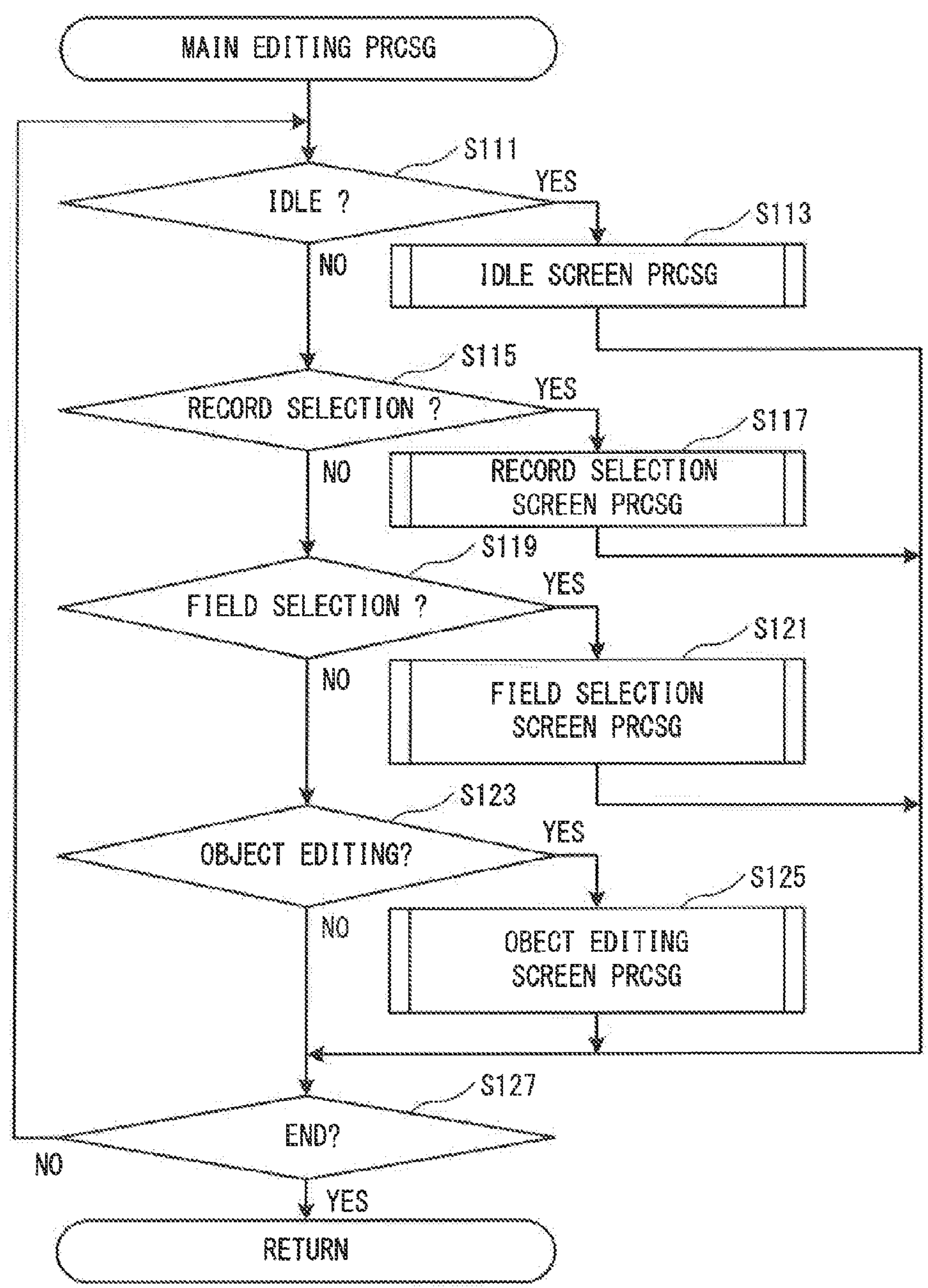
FIG. 17 is a flowchart of main editing processing.

When the CPU 41 determines that the "PRINT" button has not been touched (no at S155), the CPU 41 ends the idle screen processing and returns the processing to the main editing processing (refer to FIG. 17).

Figure 19:
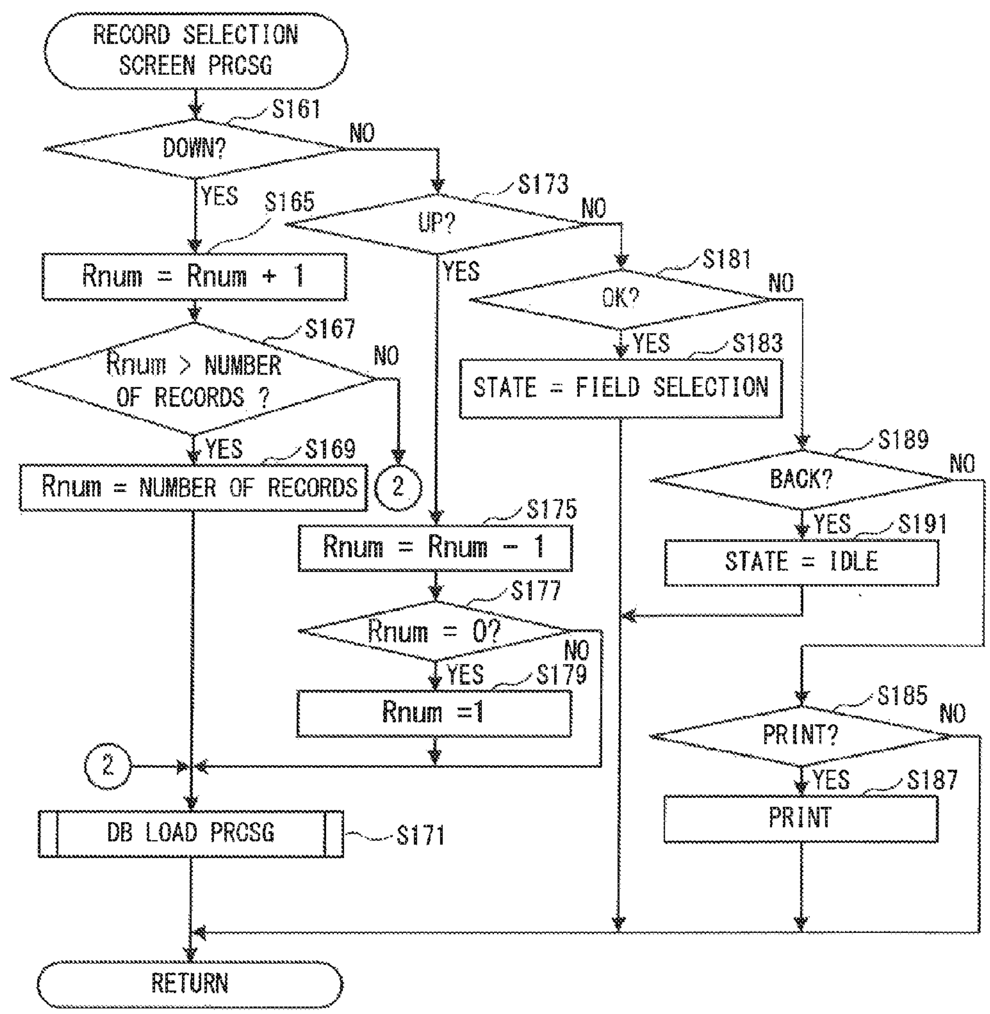
FIG. 19 is a flowchart of record selection screen processing.

The record selection screen processing will be explained with reference to FIG. 19. In the record selection screen processing, when a touch operation is performed in a state in which the record selection screen 62 (refer to FIG. 5) is displayed, corresponding processing is performed. The CPU 41 determines whether or not the "DOWN" button has been touched (S161). When the CPU 41 determines that the "DOWN" button has been touched (yes at S161), the CPU 41 adds "1" to Rnum (S165). The CPU 41 determines whether or not Rnum is larger than a total number of the records of the CSV file stored in the flash ROM 43 (S167). When the CPU 41 determines that Rnum is larger than the total number of records (yes at S167), the CPU 41 sets the total number of records as Rnum, so that Rnum does not exceed the total number of records (S169). The CPU 41 advances the processing to S171.

The CPU 41 determines whether or not the "UP" button has been touched (no at S161; S173). When the CPU 41 determines that the "UP" button has been touched (yes at S173), the CPU 41 subtracts "1" from Rnum (S175). The CPU 41 determines whether or not Rnum is "0" (S177). When the CPU 41 determines that Rnum is "0" (yes at S177), the CPU 41 sets Rnum to "1" so that Rnum is constantly equal to or greater than "1" (S179). The CPU 41 advances the processing to S171. When the CPU 41 determines that Rnum is not "0" (no at S177), the CPU 41 advances the processing to S171.

The CPU 41 performs the DB load processing (refer to FIG. 13) in order to acquire the object data corresponding to the field IDs included in each of the pieces of object information [0] to [N−1] of the template data [Tnum], of the data of the record [Rnum] of the CSV file (S171).

The DB load processing is the same as the DB load processing performed by the processing at S35 (refer to FIG. 11) and a detailed explanation thereof is therefore omitted here. By the DB load processing, the object data extracted from the record [Rnum] of the CSV file are set for each of the "object information [0]. object data" to the "object information [N−1]. object data". The CPU 41 ends the DB load processing, and after that returns the processing to the main editing processing (refer to FIG. 17).

The CPU 41 determines whether or not the "OK" button has been touched (no at S173; S181). When the CPU 41 determines that the "OK" button has been touched (yes at S181), the CPU 41 sets field selection "2" as the state information (S183). The CPU 41 ends the DB load processing and returns the processing to the main editing processing (refer to FIG. 17).

The CPU 41 determines whether or not the "BACK" button has been touched (no at S181; S189). When the CPU 41 determines that the "BACK" button has been touched (yes at S189), the CPU 41 sets idle "0" as the state information (S191). The CPU 41 ends the record selection screen processing and returns the processing to the main editing processing (refer to FIG. 17).

The CPU 41 determines whether or not the "PRINT" button has been touched (no at S189; S185). When the CPU 41 determines that the "PRINT" button has been touched (yes at S185), the CPU 41 generates the print image based on each of the "object information [0]. object data" to the "object information [N−1]. object data". The CPU 41 prints the generated print image on the tape (S187). The CPU 41 ends the record selection screen processing and returns the processing to the main editing processing (refer to FIG. 17).

When the CPU 41 determines that the "PRINT" button has not been touched (no at S185), the CPU 41 ends the record selection screen processing and returns the processing to the main editing processing (refer to FIG. 17).

Figure 20:
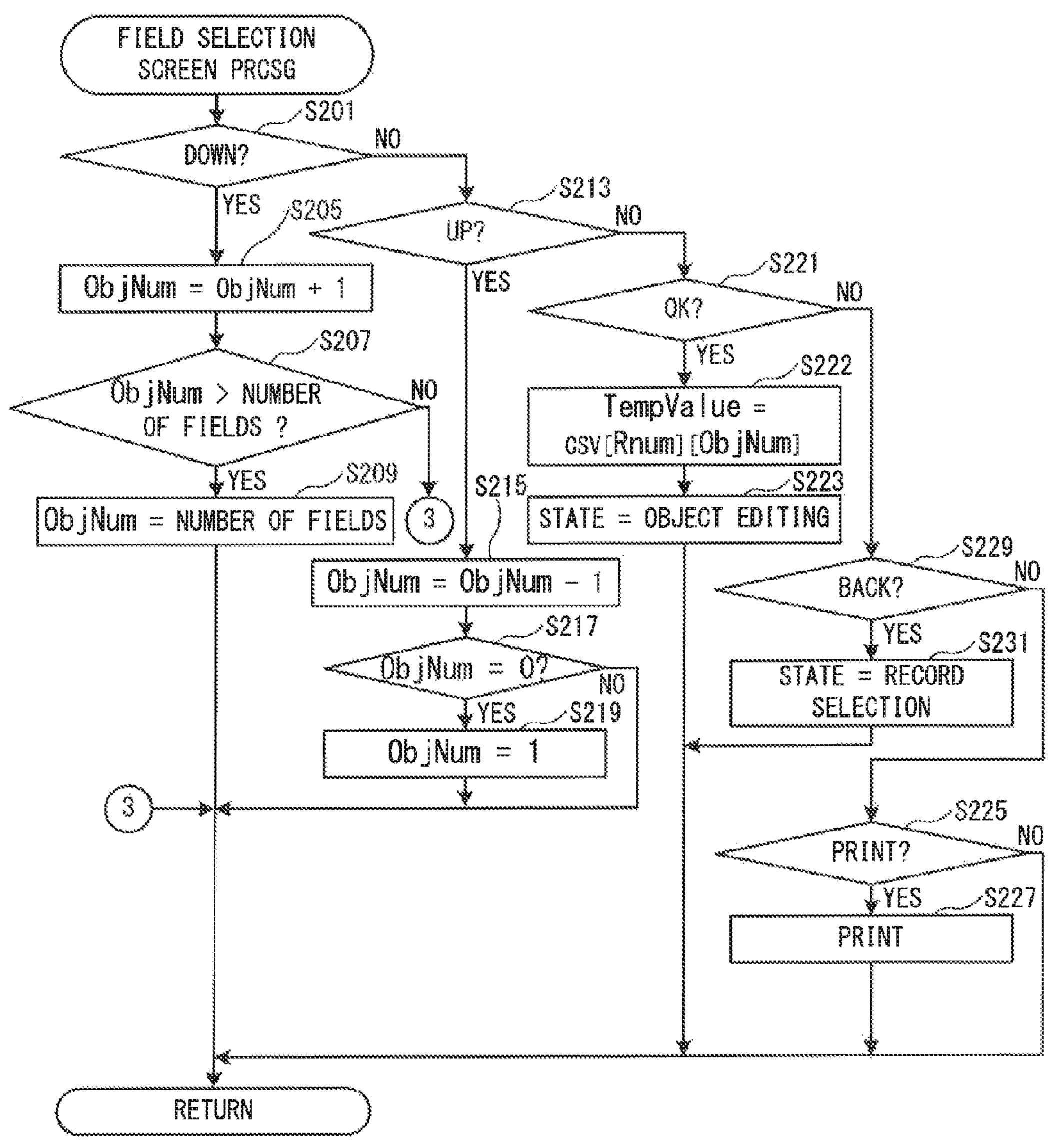
FIG. 20 is a flowchart of field selection screen processing.

The field selection screen processing will be explained with reference to FIG. 20. In the field selection screen processing, when a touch operation is performed in a state in which the field selection screen 63 (refer to FIG. 5) is displayed, corresponding processing is performed. The CPU 41 determines whether or not the "DOWN" button has been touched (S201). When the CPU 41 determines that the "DOWN" button has been touched (yes at S201), the CPU 41 adds "1" to ObjNum (S205). The CPU 41 determines whether or not ObjNum is larger than a total number of the fields (S207). When the CPU 41 determines that ObjNum is larger than the total number of fields (yes at S207), the CPU 41 sets the total number of fields as ObjNum, so that ObjNum does not exceed the total number of the fields (S209). The CPU 41 ends the field selection screen processing and returns the processing to the main editing processing (refer to FIG. 17). When the CPU 41 determines that ObjNum is not larger than the total number of fields (no at S207), the CPU 41 ends the field selection screen processing and returns the processing to the main editing processing (refer to FIG. 17).

The CPU 41 determines whether or not the "UP" button has been touched (no at S201; S213). When the CPU 41 determines that the "UP" button has been touched (yes at S213), the CPU 41 subtracts "1" from ObjNum (S215). The CPU 41 determines whether or not ObjNum is "0" (S217). When the CPU 41 determines that ObjNum is "0" (yes at S217), the CPU 41 sets ObjNum to "1" so that ObjNum is constantly equal to or greater than "1" (S219). The CPU 41 ends the field selection screen processing and returns the processing to the main editing processing (refer to FIG. 17). When the CPU 41 determines that ObjNum is not "0" (no at S217), the CPU 41 ends the field selection screen processing and returns the processing to the main editing processing (refer to FIG. 17).

The CPU 41 determines whether or not the "OK" button has been touched (no at S231; S221). When the CPU 41 determines that the "OK" button has been touched (yes at S221), the CPU 41 sets the object data of CSV [Rnum] [ObjNum] to TempValue (S222). Note that the reason for setting the object data of CSV [Rnum] [ObjNum] to TempValue is to inhibit a situation in which a value is not set in TempValue when the "OK" button is touched when no input operation has been performed in object editing screen processing (refer to FIG. 21) that will be explained later. The CPU 41 sets object editing selection "3" as the state information (S223). The CPU 41 ends the field selection screen processing and returns the processing to the main editing processing (refer to FIG. 17).

The CPU 41 determines whether or not the "BACK" button has been touched (no at S221; S229). When the CPU 41 determines that the "BACK" button has been touched (yes at S229), the CPU 41 sets record selection "1" as the state information (S231). The CPU 41 ends the field selection screen processing and returns the processing to the main editing processing (refer to FIG. 17).

The CPU 41 determines whether or not the "PRINT" button has been touched (no at S229; S225). When the CPU 41 determines that the "PRINT" button has been touched (yes at S225), the CPU 41 generates the print image based on each of the "object information [0]. object data" to the "object information [N−1]. object data". The CPU 41 prints the generated print image on the tape (S227). The CPU 41 ends the field selection screen processing and returns the processing to the main editing processing (refer to FIG. 17).

When the CPU 41 determines that the "PRINT" button has not been touched (no at S225), the CPU 41 ends the field selection screen processing and returns the processing to the main editing processing (refer to FIG. 17).

The object editing screen processing will be explained with reference to FIG. 21. In the object editing screen processing, when a touch operation is performed in a state in which the object editing screen 64 (refer to FIG. 5) is displayed, corresponding processing is performed. The CPU 41 determines whether or not the ten-key buttons have been touched (S232). When the CPU 41 determines that the ten-key buttons have been touched (yes at S232), the CPU 41 identifies a value that is input, based on the touched ten-key button. The CPU 41 sets the input value as TempValue (S233). The CPU 41 ends the object editing screen processing and returns the processing to the main editing processing (refer to FIG. 17).

The CPU 41 determines whether or not the "OK" button has been touched (no at S232; S235). When the CPU 41 determines that the "OK" button has been touched (yes at S235), the CPU 41 performs data editing processing (refer to FIG. 22) that edits CSV [Rnum] [ObjNum], based on the value set as TempValue (S237).

Figure 22:
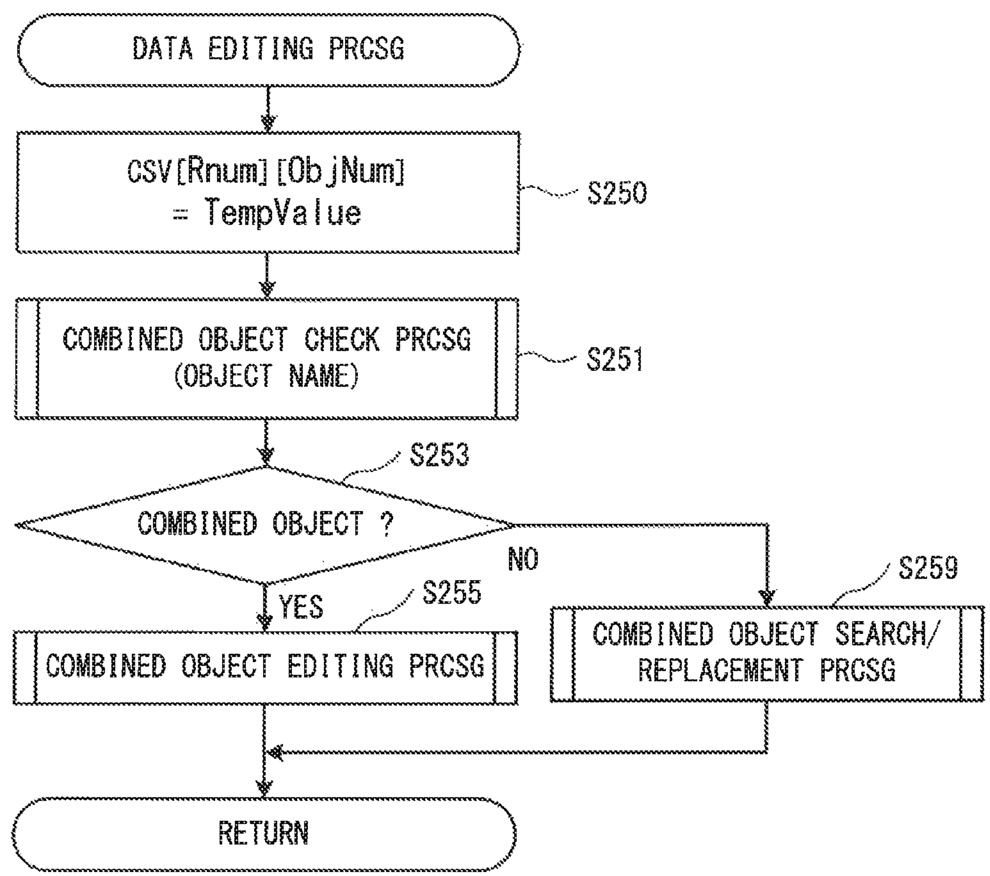
FIG. 22 is a flowchart of data editing processing.

The data editing processing will be explained with reference to FIG. 22. The CPU 41 updates CSV [Rnum] [ObjNum] to the input TempValue (S250). The CPU 41 determines whether or not the field ID that is the same as ObjNum is included in one of the pieces of object information [0] to [N−1] of the template data [Tnum]. When the field ID that is the same as ObjNum is included, the CPU 41 performs the combined object check processing (refer to FIG. 15), in order to determine, based on the object name, whether or not the corresponding object is the combined object (S251). The object name of the object information in which the field ID that is the same as ObjNum is included is set as a parameter for the combined object check processing.

It should be noted that when the field ID that is the same as ObjNum is not included in one of the pieces of object information [0] to [N−1] included in the template data [Tnum], the CPU 41 sets "0" as the parameter for the combined object check processing.

The combined object check processing is the same as the combined object check processing performed by the processing at S67 (refer to FIG. 14) and an explanation thereof is therefore omitted here. When it is determined by the combined object check processing that it is the combined object, "0" is stored for the flag information in the RAM 42. When it is determined that it is not the combined object, "−1" is stored for the flag information in the RAM 42. Note that, when "0" is set as the parameter of the combined object check processing, "−1" is stored for the flag information in the RAM 42, by the combined object check processing.

After the combined object check processing (S251), the CPU 41 determines whether or not it is the combined object, based on the flag information stored in the RAM 42 (S253). When it is the combined object, this means that CSV [Rnum]

[ObjNum] updated by the processing at S250 based on the TempValue is the combined object data. In this case, it is necessary to also edit the single object data that is the basis of the combined object data. When the CPU 41 determines that it is the combined object (yes at S253), the CPU 41 performs the combined object editing processing (refer to FIG. 23), in order to edit the single object data that is the basis of the combined object data (S255). The object name of the object information in which the field ID that is the same as ObjNum is included is set as a parameter of the combined object editing processing.

The combined object editing processing will be explained with reference to FIG. 23. The CPU 41 sets the character code of the object name of the parameter as ObjName (S273). The CPU 41 deletes the character code "0x5F" of the "_" at the start and the end of ObjName (S275). The CPU 41 sets count3 to "0" (S277). The CPU 41 determines whether or not a number of character codes included in ObjName is greater than count3 (S279). When the CPU 41 determines that the number of character codes included in ObjName is greater than count3 (yes at S279), the CPU 41 advances the processing to S281.

The CPU 41 sets the character code of "count3" of ObjName (hereinafter referred to as ObjName(count3)) as Char (S281). When the same character code as the character code of ObjName(count3) continues from "count3+1"th onward, the CPU 41 identifies the continuous number. The CPU 41 sets the identified continuous number as Digit (S283). The CPU 41 subtracts the character code "0x41" of "A" from Char. The CPU 41 sets a result of the subtraction as FiedNum (S285).

Of TempValue, the CPU 41 extracts, from the character code of "count3"th, a character code corresponding to the number of digits of Digit. The CPU 41 sets the extracted character code as fval (S289). The CPU 41 performs specific field replacement processing (refer to FIG. 24), in order to edit the single object data that is the basis of the combined object data using fval (S291).

Figure 24:
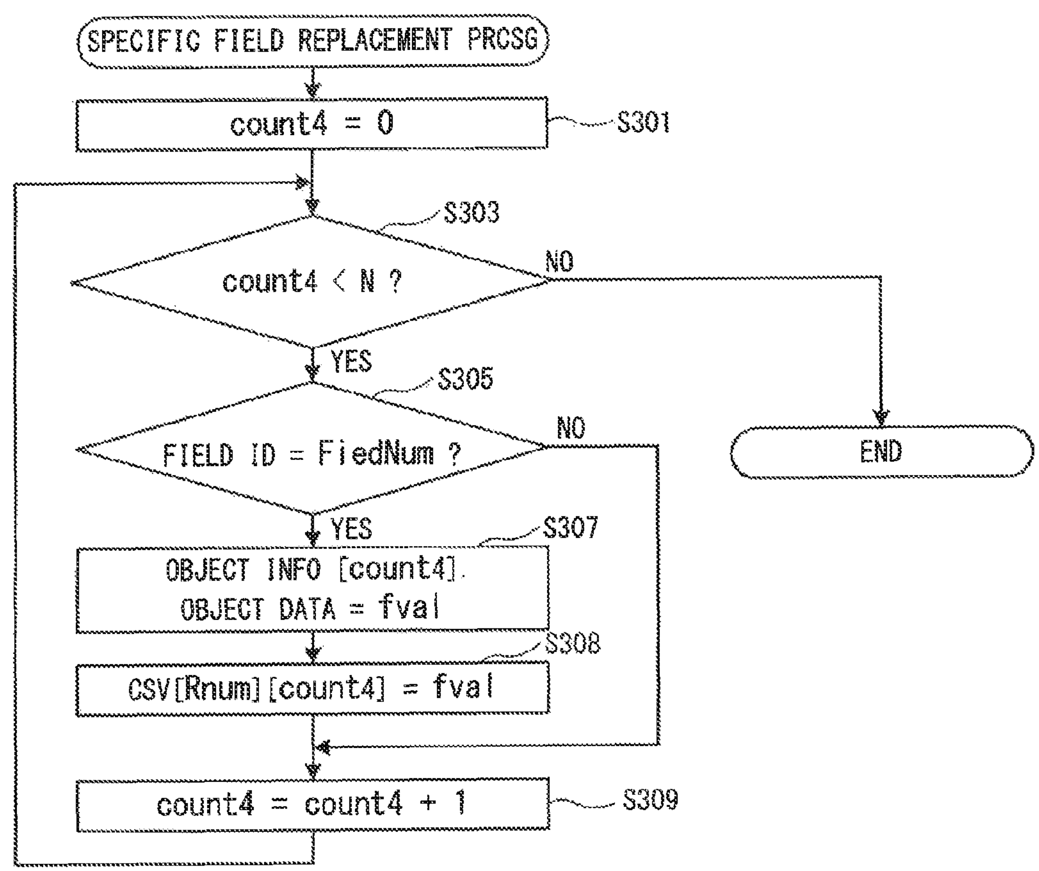
FIG. 24 is a flowchart of specific field replacement processing.

The specific field replacement processing will be explained with reference to FIG. 24. The CPU 41 sets count4 to "0" (S301). The CPU 41 determines whether or not the number N of the pieces of object information [0] to [N−1] included in the template data [Tnum] is larger than count4 (S303). When the CPU 41 determines that the number N of the pieces of object information [0] to [N−1] is larger than count4 (yes at S303), the CPU 41 determines whether or not the field ID of the object information [count4] is the same as FiedNum (S305). When the field ID of the object information [count4] is the same as FiedNum, this means that the object corresponding to the object information [count4] is the single object that is the basis of the combined object. When the CPU 41 determines that the field ID of the object information [count4] is the same as FiedNum (yes at S305), the CPU 41 sets fval as "object information [count4]. object data" (S307). In this way, the single object data that is the basis of the combined object data is changed in a similar manner, in accordance with the updating of the combined object data. The CPU 41 sets fval as CSV [Rnum] [FiedNum] (S308). The CPU 41 advances the processing to S309. When the CPU 41 determines that the field ID of the object information [count4] is not the same as FiedNum (no at S305), the CPU 41 advances the processing to S309.

The CPU 41 adds "1" to count4 and updates count4 (S309). The CPU 41 returns the processing to S303. When the CPU 41 determines that the number of the pieces of object information is not larger than count4 (no at S303), this means that the CPU 41 has performed the above-described processing with respect to all of the pieces of object information [0] to [N−1]. In other words, of the plurality of single object data that form the basis of the combined object data, all of the single object data that need to be updated in accordance with the updating of the combined object data have been updated. The CPU 41 ends the specific field replacement processing and returns the processing to the combined object editing processing (refer to FIG. 23).

Figure 23:
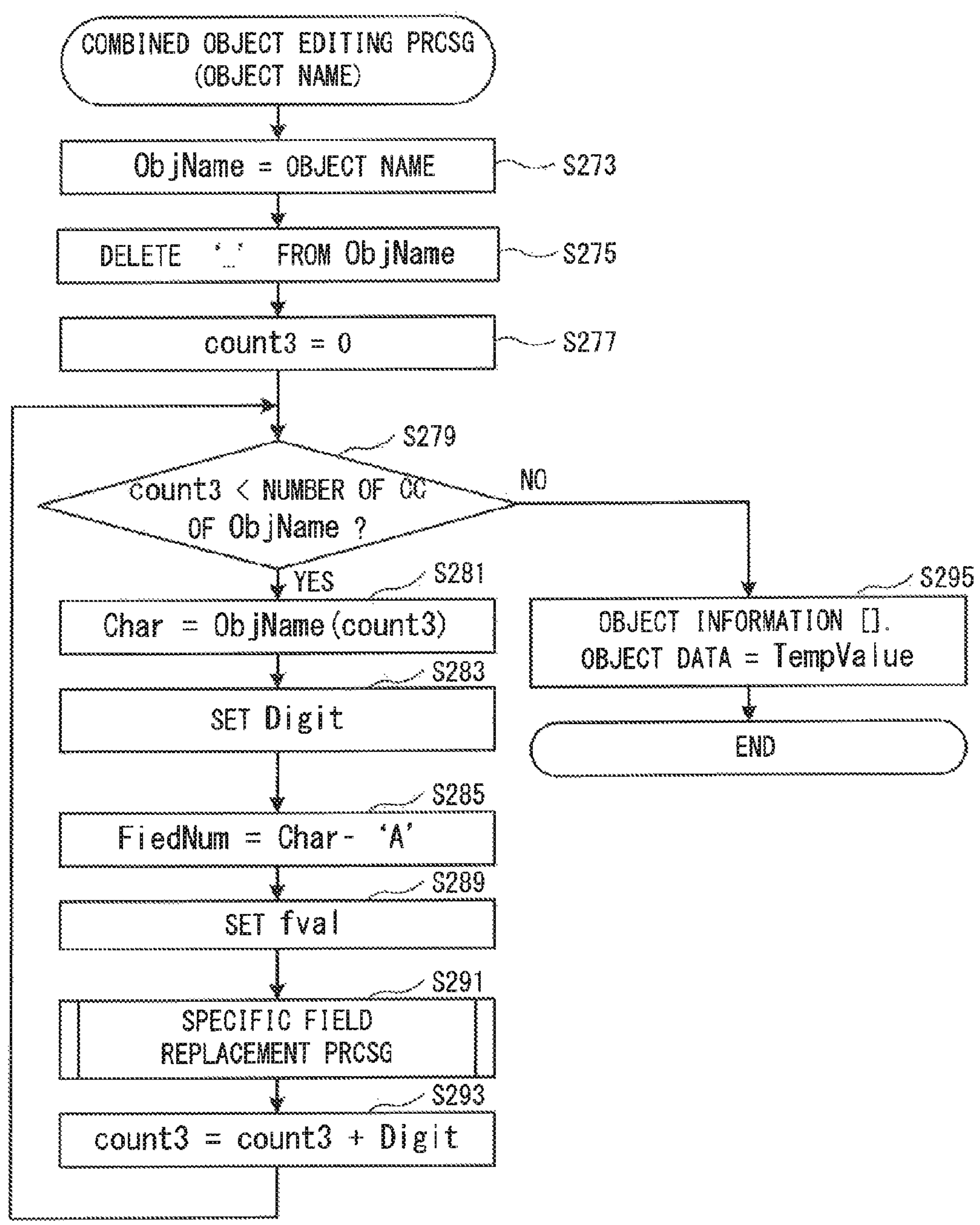
FIG. 23 is a flowchart of combined object editing processing.

As shown in FIG. 23, after ending the specific field replacement processing (S291), the CPU 41 adds Digit to count3 and updates count3 (S293). The CPU 41 returns the processing to S279.

When the processing is repeated and the number of character codes included in ObjName is equal to or lower than count3, this means that the above-described processing has been performed with respect to all of the object names. When the CPU 41 determines that the number of character codes included in ObjName is not larger than count3 (no at S279), TempValue is associated with object information [ ] that includes the same field ID as ObjNum and is stored in the RAM 42. In other words, TempValue is set as "object information [(object information index including same field ID as ObjNum)]. object data" (S295). The CPU 41 ends the combined object editing processing and returns the processing to the data editing processing (refer to FIG. 22). As shown in FIG. 22, after the CPU 41 ends the data editing processing (S255), the CPU 41 returns the processing to the object editing screen processing (refer to FIG. 21).

On the other hand, when it is determined by the combined object check processing (S251) that it is not the combined object, this means that the editing target CSV [Rnum] [ObjNum] is the single object data. In this case, when there is the combined object data that is generated based on the editing target CSV [Rnum] [ObjNum], it is necessary to also edit the combined object data. When the CPU 41 determines that it is not the combined object (no at S253), in order to also edit the combined object data, the CPU 41 performs combined object search/replacement processing (refer to FIG. 25) (S259).

Figure 25:
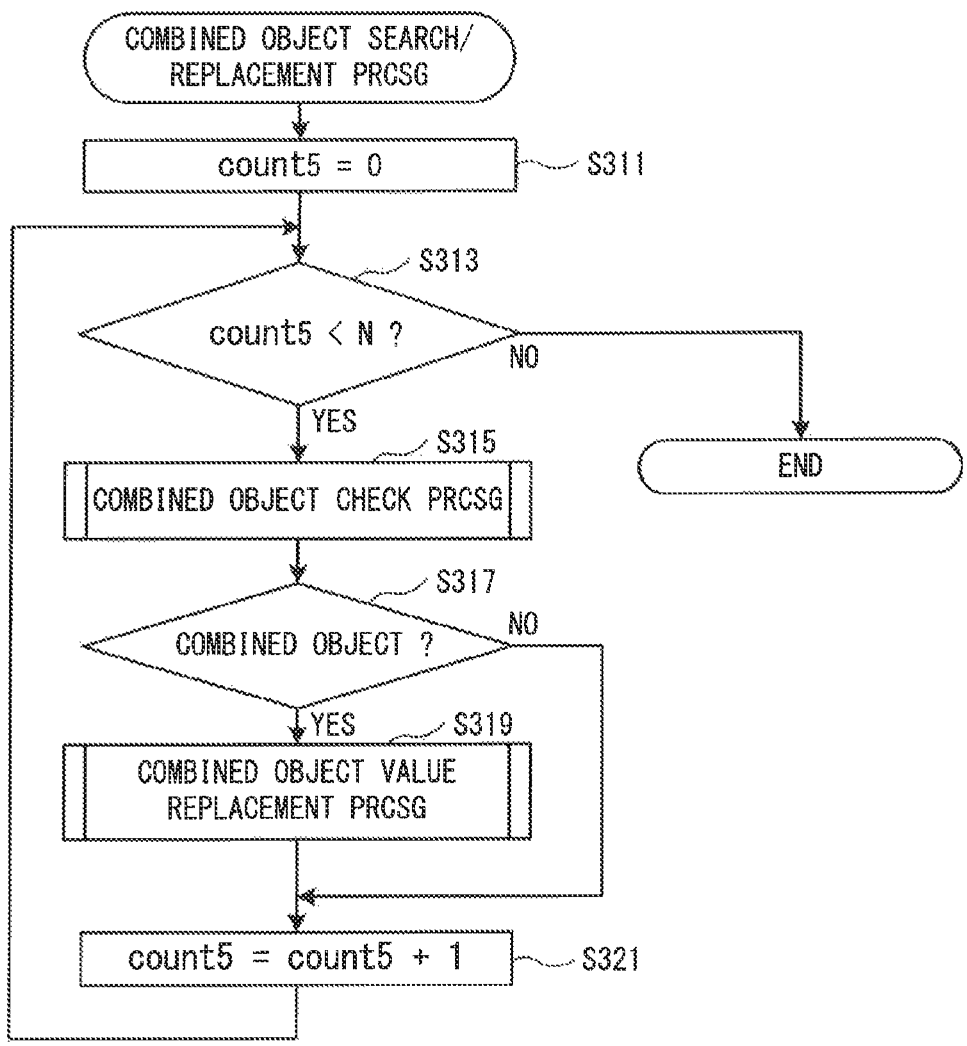
FIG. 25 is a flowchart of combined object search/replacement processing.

The combined object search/replacement processing will be explained with reference to FIG. 25. The CPU 41 sets count5 to "0" and thus initializes count5 (S311). The CPU 41 determines whether or not the number N of the pieces of object information [0] to [N−1] included in the template data [Tnum] is larger than count5 (S313). When the CPU 41 determines that the number N of the pieces of object information [0] to [N−1] is larger than count5 (yes at S313), the CPU 41 performs the combined object check processing (refer to FIG. 15), in order to determine whether the object corresponding to the object information [count5] is the combined object, based on the object name (S315). The object name included in the object information [count5] is set as a parameter for the combined object check processing. The combined object check processing is the same as the combined object check processing performed by the processing at S67 (refer to FIG. 14) and an explanation thereof is therefore omitted here.

After the combined object check processing (S315), the CPU 41 determines whether or not it is the combined object, based on the flag information stored in the RAM 42 (S317). When the CPU 41 determines that it is not the combined object (no at S317), the CPU 41 advances the processing to S321.

Meanwhile, when the object corresponding to the object information [count5] is the combined object, it is possible that CSV [Rnum] [ObjNum] is included among the plurality of single object data that form the basis of the combined object data. In this case, it is necessary to also edit the combined object data, in accordance with the updating of CSV [Rnum] [ObjNum] using TempValue. When the CPU 41 determines that it is the combined object (yes at S317), the CPU 41 performs combined object value replacement processing (refer to FIG. 26), in order to edit the combined object data as necessary (S319). The object name included in the object information [count5] and the field ID included in the object information [count5] are set as parameters of the combined object value replacement processing.

Figure 26:
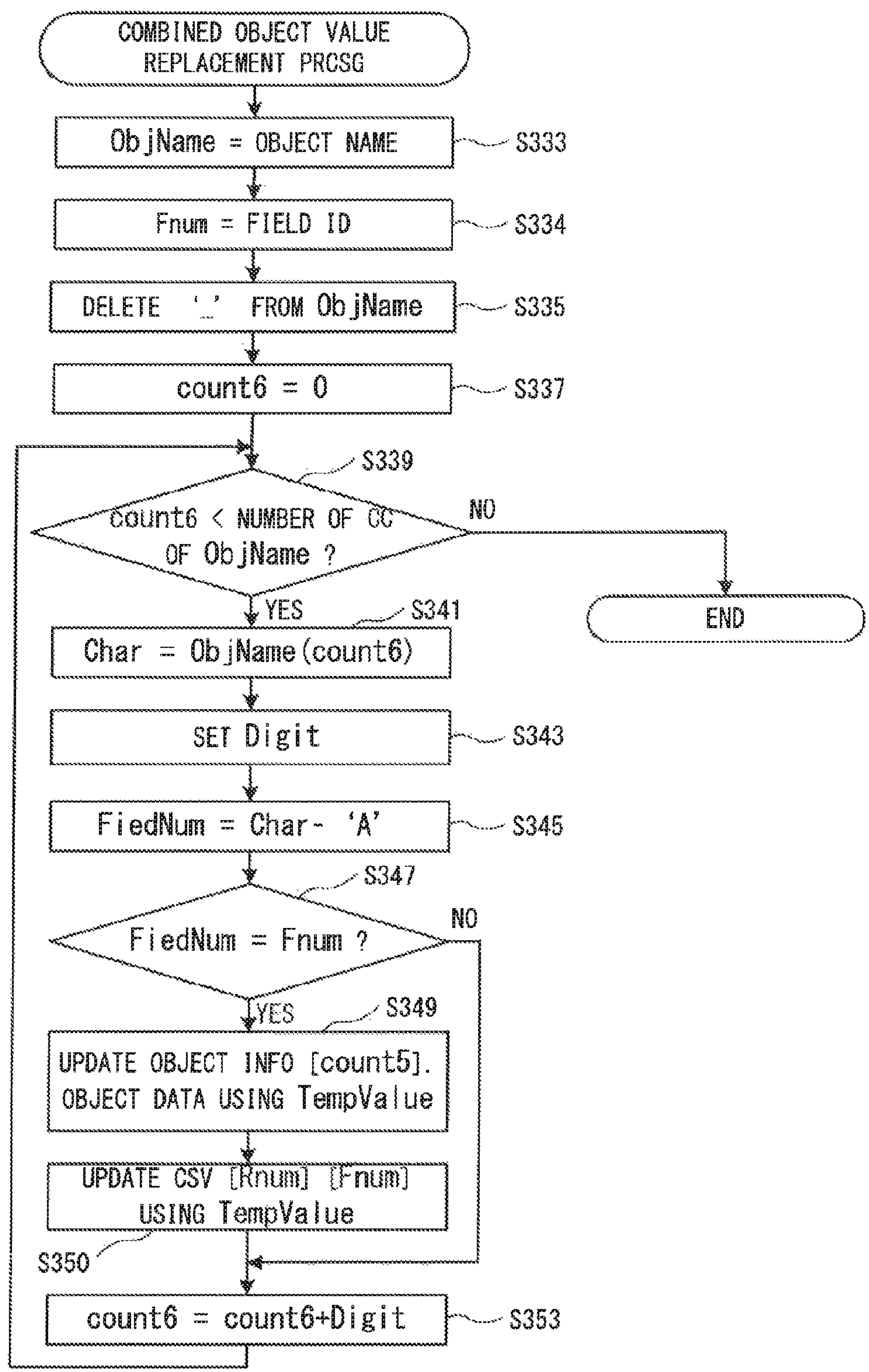
FIG. 26 is a flowchart of combined object value replacement processing.

The combined object value replacement processing will be explained with reference to FIG. 26. The CPU 41 sets the character code of the object name of the parameter as ObjName (S333). The CPU 41 sets the field ID of the parameter as Fnum (S334). The CPU 41 deletes the character code "0x5F" of the "_" at the start and the end of ObjName (S335). The CPU 41 sets a variable count6 to "0" (S337). The CPU 41 determines whether or not a number of character codes included in ObjName is greater than count6 (S339). When the CPU 41 determines that the number of character codes included in ObjName is greater than count6 (yes at S339), the CPU 41 advances the processing to S341.

The CPU 41 sets the character code of "count6"th of ObjName (hereinafter referred to as ObjName(count6)) as Char (S341). When the same character code as the character code of ObjName(count6) continues from "count6+1"th onward, the CPU 41 identifies the continuous number. The CPU 41 sets the identified continuous number as Digit (S343). The CPU 41 subtracts the character code "0x41" of "A" from Char. The CPU 41 sets a result of the subtraction as FiedNum (S345).

The CPU 41 determines whether or not FiedNum and Fnum match each other (S347). When FiedNum and Fnum match each other, this means that it is necessary to update the combined object data corresponding to the object information [count5] in accordance with the updating, using TempValue, of the single object data that is the basis of the combined object data. When the CPU 41 determines that FiedNum and Fnum match each other (yes at S347), of the "object information [count5]. object data", the CPU 41 stores TempValue as the value corresponding to the number of digits of Digit from the character code of "count6"th (S349). Of CSV [Rnum] [Fnum], the CPU 41 stores TempValue as the value corresponding to the number of digits of Digit from the character code of "count6"th (S350). The CPU 41 advances the processing to S353. When the CPU 41 determines that FiedNum and Fnum do not match each other (no at S347), the CPU 41 advances the processing to S353.

The CPU 41 adds Digit to count6 and updates count6 (S353). The CPU 41 returns the processing to S339. When the processing is repeated and the number of character codes included in ObjName is equal to or lower than count6, this means that the above-described processing has been performed with respect to all of the object names. When the CPU 41 determines that the number of character codes included in ObjName is not larger than count6 (no at S339), the CPU 41 ends the combined object value replacement processing and returns the processing to the combined object search/replacement processing (refer to FIG. 25). As shown in FIG. 25, after the combined object value replacement processing (S319), the CPU 41 advances the processing to S321.

The CPU 41 adds "1" to count5 and updates count5 (S321). The CPU 41 returns the processing to S313. When the processing is repeated and the number N of the pieces of object information [0] to [N−1] is equal to or lower than count5, this means that the above-described processing has been performed with respect to all of the pieces of object information [0] to [N−1]. When the CPU 41 determines that the number N of the pieces of object information [0] to [N−1] is not larger than count5 (no at S313), the CPU 41 ends the combined object search/replacement processing and returns the processing to the data editing processing (refer to FIG. 22). As shown in FIG. 22, after ending the combined object search/replacement processing (S259), the CPU 41 ends the data editing processing and returns the processing to the object editing screen processing (refer to FIG. 21).

Figure 21:
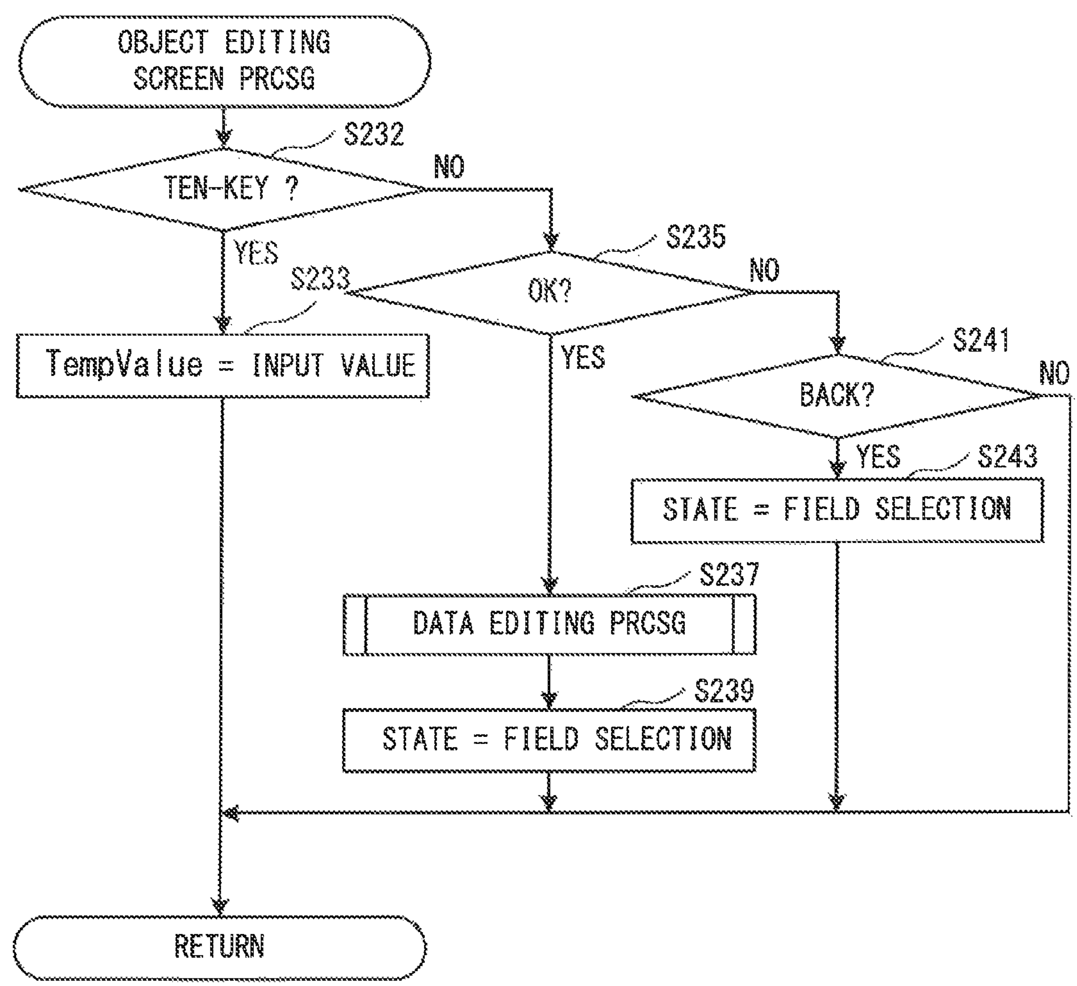
FIG. 21 is a flowchart of object editing screen processing.

As shown in FIG. 21, after ending the data editing processing (S237), the CPU 41 sets field selection "2" as the state information (S239). The CPU 41 ends the object editing screen processing and returns the processing to the main editing processing (refer to FIG. 17).

The CPU 41 determines whether or not the "BACK" button has been touched (no at S235; S241). When the CPU 41 determines that the "BACK" button has been touched (yes at S241), the CPU 41 sets field selection "2" as the state information (S243). The CPU 41 ends the object editing screen processing and returns the processing to the main editing processing (refer to FIG. 17). When the CPU 41 determines that the "BACK" button has not been touched (no at S241), the CPU 41 ends the object editing screen processing and returns the processing to the main editing processing (refer to FIG. 17).

As explained above, when the object name has "_" at the start and the end, the CPU 41 of the printer 4 determines that the object data of the corresponding object is the combined object. The CPU 41 selects two or more of the single object data from the plurality of single object data of the CSV file (S106). The CPU 41 generates the combined object data by combining the selected two or more object data (S107). Therefore, the CPU 41 can generate the combined object data based on the object name. The CPU 41 can print the print image based on the generated combined object data (S157, S187, S227). Thus, the CPU 41 can easily perform the printing based on the combined object data, without requiring a setting operation by the user.

There is a case in which at least one of the plurality of single object data that form the basis of the combined object data is updated (S250). In this case, the CPU 41 changes a section of the combined object data that corresponds to the updated single object data using the same change content, and thus changes the combined object data (S349). In this manner, when the user has changed the single object data, it is possible to omit an effort to change the combined object data at the same time. As a result, the user can easily change the single object data and the combined object data.

There is a case in which the combined object data is changed (S250). In this case, the CPU 41 can change the single object data that form the basis of the changed combined object data, using the same change content (S307). In this way, when the user has changed the combined object data, it is possible to omit an effort to change the single object data that form the basis of the combined object data at the same time. Thus, the user can easily change the single object data and the combined object data.

Depending on whether or not "_" is included at the start and the end of the object name, the CPU 41 determines whether or not the object corresponding to the object name is the single object or the combined object (S81). In this case, the CPU 41 can easily distinguish whether or not it is the object name of the combined object.

In the object name of the combined object, field IDs "A," "B" . . . , of fields in which the single object data that form the basis of the combined object data are stored, are arranged sequentially. The CPU 41 can generate the combined object data by combining the single object data of the fields corresponding to the field IDs in the order of the field IDs. As a result, the CPU 41 can easily generate the combined object data based on the field IDs included in the object name and their order.

The CPU 41 can create a barcode based on the combined object data of the field ID "E" and can print the print image that includes the barcode. The printer 4 can print the barcode showing the two or more selected object data selected based on the object name from among the plurality of single object data, onto a print medium, based on the combined object data.

The present disclosure is not limited to the above-described embodiment, and various modifications are possible. With respect to the above-described embodiment, "_" that is added to the start and the end of the object name in order to indicate that it is the object name of the combined object may be another predetermined code. Alternatively, the predetermined code may be added to only the start or the end of the object name. Further, the predetermined code may be included in a section of the object name other than the start and the end.

The fact that the object name is the object name of the combined object may be indicated using a method other than that of adding the predetermined code. For example, it may be indicated that it is the combined object data by including, in the object name, a desired code that continues for a predetermined number (10, for example) of digits or more.

In the above-described embodiment, the number of digits of the single object data that forms the basis of the combined object data is determined in accordance with the continuous number of the field ID included in the object name. The number of digits of the single object data may be represented using numerals. For example, an object name "_AABBBBBCCCCC_" in the above-described embodiment may be represented by "_A2B5C5_". Note that the numerals included in the object name represent the number of digits of the single object data of the immediately preceding field ID. In the case of the above-described object name, the object name shows that the single object data of the field ID "A" is two digits, the single object data of the field ID "B" is 5 digits and the single object data of the field ID "C" is 5 digits.

When "#" is included in the object name, a check digit may be added to a corresponding position, of the combined object data.

In the above-described embodiment, the combined object data (the combined object data of the field ID "E" as shown in FIG. 2, for example) is included in the CSV file transmitted from the PC 5 to the printer 4. In contrast to this, the PC 5 may transmit the CSV file that does not include the combined object data to the printer 4. Based on the object name of the object information, the CPU 41 of the printer 4 may determine whether or not it is the combined object, using the same method as that described above. When the CPU 41 determines that it is the combined object, the CPU 41 may generate the combined object data by combining the plurality of single object data that form the basis of the combined object data. The CPU 41 may newly store, in the CSV file, the generated combined object data, as the combined object data of the field IDs included in the corresponding object information.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer electrically connectable to an external device to receive data and including a print mechanism installed to form a print image on a print medium based on a plurality of object data received from the external device, the print image having a plurality of objects, each of the plurality of objects respectively corresponding to a different one of the plurality of object data, the printer comprising:

a memory configured to store at least the plurality of object data; and a processor electrically connected to the memory and the print mechanism to control a storing state of the memory and operation of the print mechanism, the processor configured to perform processes comprising:

storing, in the memory, a database file linked to a template data based on the plurality of the object data received from the external device, the database file including a record including a plurality of object data each of which is associated with one of a plurality of fields, the record including a first object data associated with a first field out of the plurality of the fields and corresponding to a first object, a second object data associated with a second field out of the plurality of the fields, and a third object data associated with a third field out of the plurality of the fields and corresponding to a combined object, the combined object being an object to be formed in the print image, the third object data being a combined data generated by arranging the first object data and the second object data in order, the record including the first object data, the second object data, and the third object data, the template data being a data received from the external device and stored in the memory and including a combined object name and a plurality of field identifiers, a first field identifier, of the plurality of the field identifiers, corresponding to a first character and associated with the first field, and a second field identifier, of the plurality of the field identifiers, corresponding to a second character different from the first character and associated with the second field, the combined object name associated with the combined object, the combined object name including at least one of the first characters having a first number of digits and at least one of the second characters having a second number of digits, the first number corresponding to a number of digits of the first object data, the second number corresponding to a number of digits of the second object data, each of the at least one of the first characters being a same character, each of the at least one of the second characters being a same character different from each of the at least one of the first characters, and the at least one of the first characters and the at least one of the second characters being arranged in order; and obtaining a template;

inserting the third object data into the template; and controlling the print mechanism to form the print image including the template with the first object and the combined object based on the template data and the third object data.

2. The printer according to claim 1, wherein the processor is configured to perform processes further comprising:

first changing the first object data; and second changing the third object data in accordance with the first changing, by changing a part, which corresponds to the first object data, of the third object data based on the combined object name and the first character corresponding to the first field identifier, the first field identifier associated with the first object data.

3. The printer according to claim 2, wherein the processor is configured to perform processes further comprising:

third changing a part, which corresponds to the first object data, of the third object data; and fourth changing the first object data in accordance with the third changing, based on the combined object name and the first character corresponding to the first field identifier, the first field identifier associated with the first object data.

4. The printer according to claim 1, wherein the combined object name includes a specified character code being different from the first character and the second character.

5. The printer according to claim 1, wherein the print image includes a barcode that is the combined object corresponding to the third object data.

6. The printer according to claim 4, wherein the combined object name starts or ends with the specified character code.

7. A printer electrically connectable to an external device to receive data and including a print mechanism installed to form a print image on a print medium based on a plurality of object data received from the external device, the print image having a plurality of objects, each of the plurality of objects respectively corresponding to a different one of the plurality of object data, the printer comprising:

a memory configured to store at least the plurality of object data; and a processor electrically connected to the memory and the print mechanism to control a storing state of the memory and operation of the print mechanism, the processor configured to perform processes comprising:

storing, in the memory, a database file linked to a template data based on the plurality of the object data received from the external device, the database file including a record including a plurality of object data each of which is associated with one of a plurality of fields, the record including a first object data associated with a first field out of the plurality of the fields and corresponding to a first object, a second object data associated with a second field out of the plurality of the fields, and a third object data associated with a third field out of the plurality of the fields and corresponding to a combined object, the combined object being an object to be formed in the print image, the third object data being a combined data generated by arranging the first object data and the second object data in order, the record including the first object data, the second object data, and the third object data, the template data being a data received from the external device and stored in the memory and including an object name and a plurality of field identifiers, a first field identifier, out of the plurality of the field identifiers, corresponding to a first character and associated with the first field, and a second field identifier, out of the plurality of the field identifiers, corresponding to a second character different from the first character and associated with the second field, the object name associated with the combined object, the object name including one character of the first character, a first number, one character of the second character, and a second number, the first number corresponding to a number of digits of the first object data, and the second number corresponding to a number of digits of the second object data, and the one character of the first character, the first number, the one character of the second character, and the second number being arranged in order;

and controlling the print mechanism to form the print image including the first object and the combined object based on the template data and the third object data.

8. The printer according to claim 7, wherein the processor is configured to perform processes further comprising:

first changing the first object data; and second changing the third object data in accordance with the first changing, by changing a part, which corresponds to the first object data, of the third object data based on the object name and the first character corresponding to the first field identifier, the first field identifier associated with the first object data.

9. The printer according to claim 8, wherein the processor is configured to perform processes further comprising:

third changing a part, which corresponds to the first object data, of the third object data; and fourth changing the first object data in accordance with the third changing, based on the object name and the first character corresponding to the first field identifier, the first field identifier associated with the first object data.

10. The printer according to claim 7, wherein the object name includes a specified character code being different from the first character and the second character.

11. The printer according to claim 7, wherein the print image includes a barcode that is the combined object corresponding to the third object data.

12. The printer according to claim 10, wherein the object name starts or ends with the specified character code.

* * * * *